US012748361B2

(12) United States Patent
Yamauchi et al.

(10) Patent No.: US 12,748,361 B2
(45) Date of Patent: Sep. 29, 2026

(54) IMAGE FORMING APPARATUS

(71) Applicant: CANON KABUSHIKI KAISHA, Tokyo (JP)

(72) Inventors: Daigo Yamauchi, Kanagawa (JP); Kazuhiro Hosohara, Kanagawa (JP); Tomoya Tateishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/195,243

(22) Filed: Apr. 30, 2025

(65) Prior Publication Data

US 2025/0341793 A1 Nov. 6, 2025

(30) Foreign Application Priority Data

May 2, 2024 (JP) ................................ 2024-074991

(51) Int. Cl.
*G03G 15/01* (2006.01)
*G03G 15/00* (2006.01)
(Continued)

(52) U.S. Cl.
CPC ..... *G03G 15/0173* (2013.01); *G03G 15/0121* (2013.01); *G03G 15/0147* (2013.01); *G03G 15/0152* (2013.01); *G03G 15/0896* (2013.01); *G03G 15/50* (2013.01); *G03G 21/145* (2013.01); *G03G 21/1609* (2013.01); *G03G 21/1619* (2013.01); *G03G 21/1647* (2013.01);
(Continued)

(58) Field of Classification Search
CPC ........... G03G 15/0147; G03G 15/0152; G03G 15/0173; G03G 15/0896; G03G 15/50; G03G 15/0121; G03G 21/145; G03G 21/1609; G03G 21/1619; G03G 21/1647; G03G 21/1676; G03G 21/1839; G03G 21/1842
See application file for complete search history.

(56) References Cited

U.S. PATENT DOCUMENTS

2008/0240796 A1* 10/2008 Morioka .................. F16D 1/10 399/279
2008/0292357 A1* 11/2008 Taguchi ............ G03G 15/0121 399/119
2024/0152073 A1* 5/2024 Nitta .................... G03G 15/751

FOREIGN PATENT DOCUMENTS

| | | | |
|---|---|---|---|
| JP | 2007183305 | A | 7/2007 |
| JP | 2008096852 | A | 4/2008 |
| JP | 2013174854 | A | 9/2013 |

* cited by examiner

*Primary Examiner* — Joseph S Wong
(74) *Attorney, Agent, or Firm* — Canon.U.S.A., Inc. IP Division

(57) ABSTRACT

An image forming apparatus includes a rotary including a developing roller and a storage portion, a toner cartridge, a support member movable between a first position and a second position, a drive source configured to move the support member in a first direction and in a second direction, a detection mechanism including a moving member and a sensor portion, and a controller. The controller is configured to determine that the support member is in the second position in a case where movement direction of the support member by the drive source is the first direction and the sensor portion is in the first detection state, and to determine that the support member is in the first position in a case where the movement direction of the support member by the drive source is the second direction and the sensor portion is in the first detection state.

19 Claims, 15 Drawing Sheets

(51) Int. Cl.
*G03G 15/08* (2006.01)
*G03G 21/14* (2006.01)
*G03G 21/16* (2006.01)
*G03G 21/18* (2006.01)

(52) U.S. Cl.
CPC ..... *G03G 21/1676* (2013.01); *G03G 21/1839* (2013.01); *G03G 21/1842* (2013.01)

IMAGE FORMING APPARATUS

BACKGROUND

Field

The present disclosure relates to an image forming apparatus that forms an image on a recording material.

Description of the Related Art

Japanese Patent Application Laid-Open No. 2007-183305 discloses an image forming apparatus of a rotary development system that forms a color image by rotating a rotary including a plurality of developing rollers. Japanese Patent Application Laid-Open No. 2008-096852 discloses an image forming apparatus of a rotary development system in which four toner cartridges each storing toner of a different color are attachable to and detachable from a rotary.

SUMMARY

The present disclosure provides an image forming apparatus an image forming apparatus capable of detecting a position of a support member in a simple configuration.

According to some embodiments, an image forming apparatus includes a rotary configured to rotate and including a developing roller and a storage portion configured to store toner to be supplied to the developing roller, a toner cartridge that is configured to store the toner and that is attachable to and detachable from the rotary, a support member attached to the rotary, configured to support the toner cartridge, and movable between a first position and a second position, the first position being a position where supply of the toner from the toner cartridge to the storage portion is allowed, the second position being a position where attachment and detachment of the toner cartridge to and from the rotary are allowed, a drive source configured to move the support member in a first direction from the first position toward the second position and move the support member in a second direction from the second position toward the first position, a detection mechanism including a moving member configured to move in an interlocked manner with movement of the support member by the drive source, and a sensor portion configured to output a signal corresponding to a position of the moving member, and a controller configured to receive the signal from the sensor portion and control the drive source, wherein the sensor portion is in a first detection state in a case where the support member is at the first position and in a case where the support member is at the second position, and the sensor portion is in a second detection state different from the first detection state while the support member is being moved from the first position toward the second position or from the second position toward the first position, wherein the controller is configured to determine that the support member is in the second position in a case where movement direction of the support member by the drive source is the first direction and the sensor portion is in the first detection state, and wherein the controller is configured to determine that the support member is in the first position in a case where the movement direction of the support member by the drive source is the second direction and the sensor portion is in the first detection state.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described below with reference to drawings.

First Embodiment

An image forming apparatus 1 according to a first embodiment will be described with reference to FIGS. 1 to 12C. In the description below and each drawing, the vertical direction in the case where the image forming apparatus 1 is disposed on a horizontal surface will be referred to as a Z direction. A direction that intersects with the Z direction and that is the direction of a rotational axis 90C of a rotary body 90 (rotational axis direction of a rotary) that will be described later will be referred to as a Y direction. A direction intersecting with both the Z direction and the Y direction will be referred to as an X direction. The X direction and the Y direction are preferably horizontal directions. In addition, the X direction, the Y direction, and the Z direction are preferably orthogonal to each other. In addition, the sides pointed by arrows X, Y, and Z illustrated in each diagram will be respectively referred to as +X, +Y, and +Z sides, and sides opposite thereto will be respectively referred to as −X, −Y, and −Z sides.

Overall Configuration of Image Forming Apparatus

First, an overall configuration of the image forming apparatus 1 will be described. The image forming apparatus 1 is a laser beam printer that forms an image on a sheet S by using an electrophotographic method. Specifically, the image forming apparatus 1 is a color laser beam printer including four developing units 50*y*, 50*m*, 50*c*, and 50*k*. As the sheet S serving as a recording material (recording medium), various sheet materials of different sizes and different materials can be used. Examples of the various sheet materials include paper sheets such as plain paper sheets and cardboards, plastic films, cloths, surface-treated sheet materials such as coated paper sheets, and sheet materials of irregular shapes such as envelopes and index paper sheets.

Figure 1:
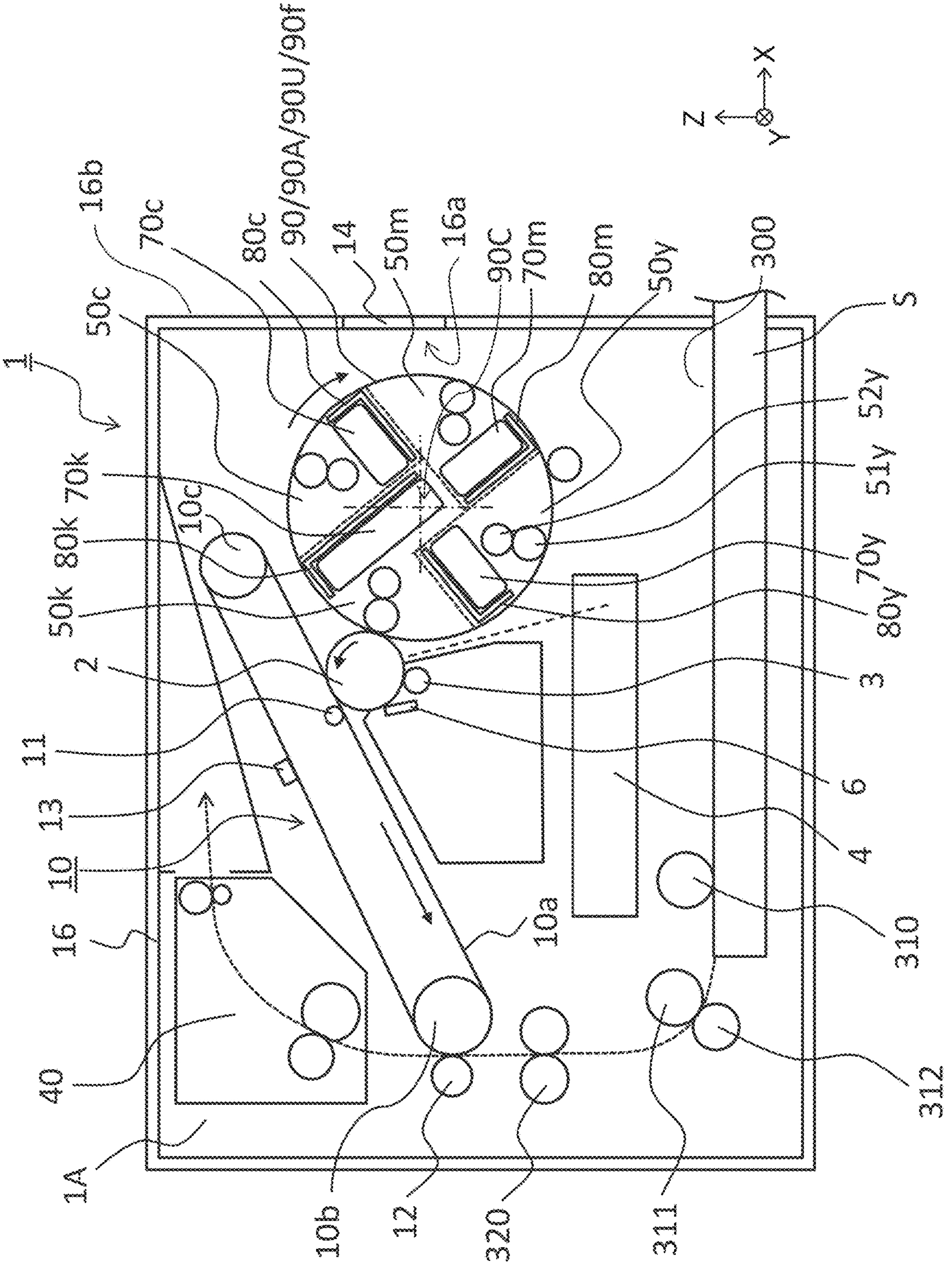
FIG. 1 is a schematic view of an image forming apparatus according to a first embodiment.
Figure 2:
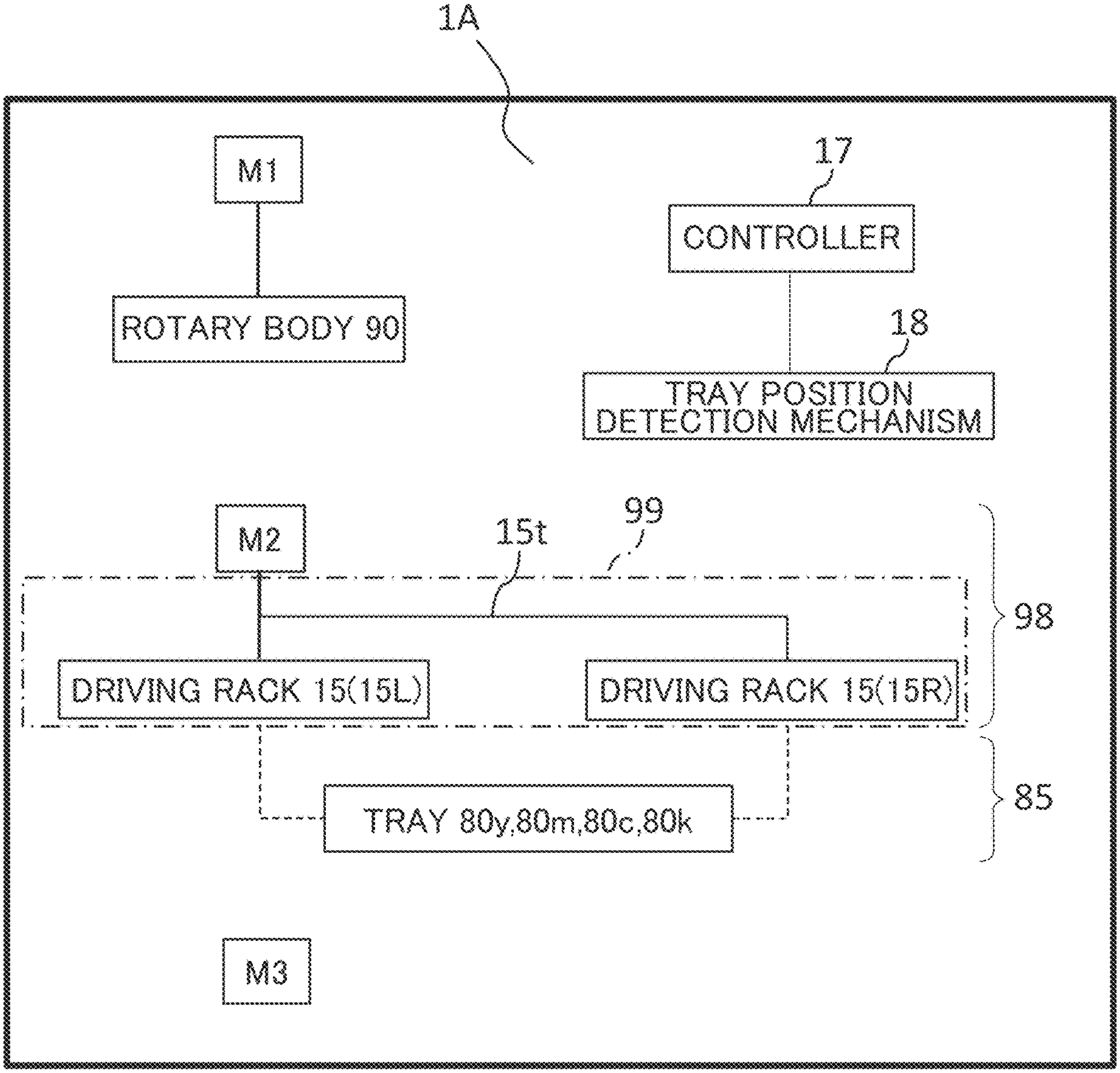
FIG. 2 is a configuration diagram of the image forming apparatus according to the first embodiment.
Figure 3:
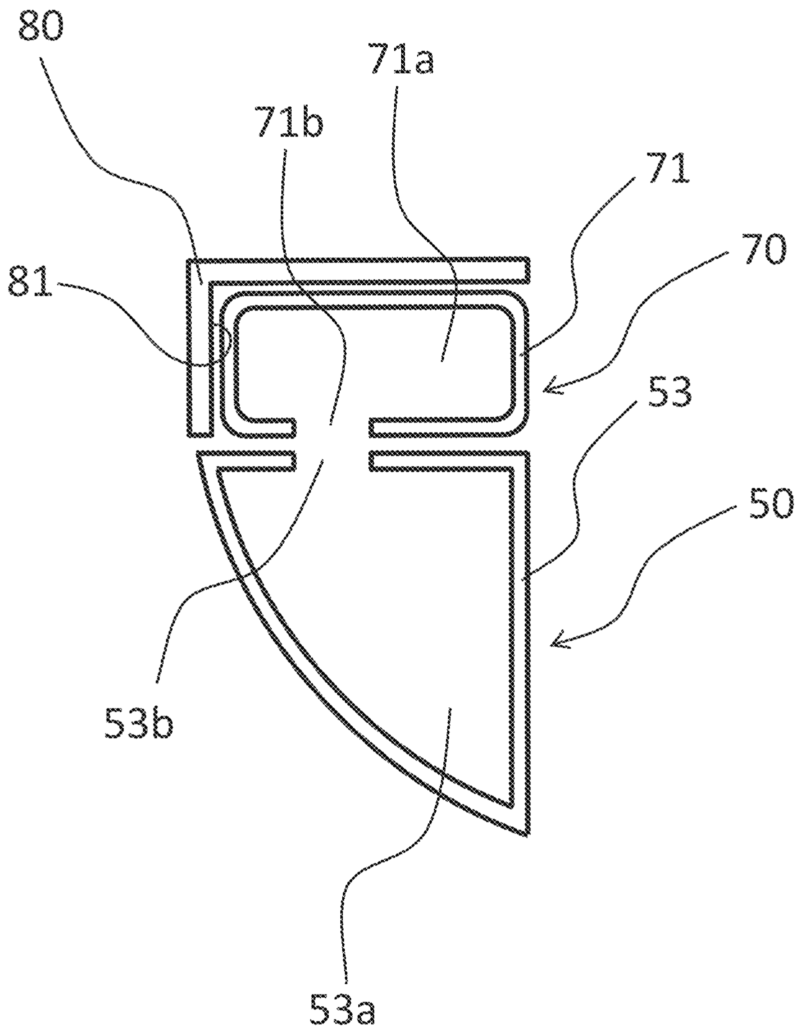
FIG. 3 is a schematic view of a developing unit, a toner cartridge, and a tray according to the first embodiment.

A schematic configuration of the image forming apparatus 1 and an image forming operation will be described with reference to FIGS. 1, 2, and 3. FIG. 1 is a schematic diagram illustrating a sectional configuration of the image forming apparatus 1. FIG. 2 is a diagram for describing drive sources of the image forming apparatus 1. FIG. 3 is a concept diagram illustrating elements for supplying toner from a toner cartridge 70 to a developing unit 50.

As illustrated in FIG. 1, the image forming apparatus 1 includes an image forming apparatus main body (hereinafter referred to as an apparatus body 1A), and toner cartridges 70*y*, 70*m*, 70*c*, and 70*k* that are attachable to and detachable from the apparatus body 1A. The apparatus body 1A of the present embodiment is a part of the image forming apparatus 1 excluding the toner cartridges 70*y*, 70*m*, 70*c*, and 70*k*.

The apparatus body 1A of the image forming apparatus 1 includes a photosensitive member 2 for use in an electrophotographic system. The photosensitive member has a drum shape (cylindrical shape) and is hereinafter referred to as a photosensitive drum 2. The photosensitive member 2 serves as an image bearing member that bears an electrostatic latent image. A charging roller 3, a scanner 4 serving as an exposing device, and a cleaning unit 6 are disposed around the photosensitive drum 2.

The charging roller 3 is an example of a charging means or a charging unit for uniformly charging the photosensitive drum 2. The scanner 4 is an example of an exposing means or an exposing unit that exposes the photosensitive drum 2 by irradiating the photosensitive drum 2 with laser light in accordance with image information. By irradiating the photosensitive drum 2 with the laser light after charging, an electrostatic latent image is formed on each surface of the photosensitive drum 2. The cleaning unit 6 is an example of a cleaning means or a cleaning portion that removes toner remaining on the surface of the photosensitive drum 2.

Further, the apparatus body 1A includes a sheet storage portion 300, a pickup roller 310, a feed roller 311, a separation roller 312, a conveyance roller pair 320, a secondary transfer roller 12, a fixing device 40, and an intermediate transfer unit 10. The pickup roller 310 is an example of a feeding means or a feeding unit that feeds the sheet S. The feed roller 311 and the separation roller 312 are an example of a separation conveyance unit that conveys sheets S while separating the sheets S from each other by frictional force. The secondary transfer roller 12 is an example of a transfer means or a transfer unit that transfers an image from an intermediate transfer belt 10*a* onto the sheet S.

The intermediate transfer unit 10 includes an intermediate transfer belt 10*a*, a belt driving roller 10*b*, a tension roller 10*c*, a cleaning device 13, and a primary transfer roller 11. The intermediate transfer belt 10*a* is an example of an intermediate transfer member that bears an image transferred from the photosensitive drum 2 through primary transfer and conveys the image so as to transfer the image onto the sheet S through secondary transfer. The intermediate transfer belt 10*a* is stretched over the belt driving roller 10*b* and the tension roller 10*c*. The belt driving roller 10*b* is a driving member that is rotationally driven by a drive source to convey the intermediate transfer belt 10*a*.

In addition, the apparatus body 1A includes a rotary body 90, which serves as a rotary, rotator, or developing device, including the developing units 50*y*, 50*m*, 50*c*, and 50*k*. As will be described later, trays 80*y*, 80*m*, 80*c*, and 80*k*, which serve as support members, are attached to the rotary body 90 in the present embodiment. Toner cartridges 70*y*, 70*m*, 70*c*, and 70*k* are detachably attached to the trays 80*y*, 80*m*, 80*c*, and 80*k*.

In the description below, a plurality of members having similar functions can be distinguished by numbers given thereto. For example, one of the toner cartridges 70*y*, 70*m*, 70*c*, and 70*k* may be referred to as a first toner cartridge, one of the remaining three may be referred to as a second toner cartridge, one of the remaining two may be referred to as a third toner cartridge, and the last one may be referred to as a fourth toner cartridge. Similarly, one of the trays 80*y*, 80*m*, 80*c*, and 80*k* may be referred to as a first tray, one of the remaining three may be referred to as a second tray, one of the remaining two may be referred to as a third tray, and the last one may be referred to as a fourth tray. That is, one of the trays 80*y* to 80*k* is an example of a first support member, another one of the trays 80*y* to 80*k* is an example of a second support member, yet another one of the trays 80*y* to 80*k* is an example of a third support member, and the last one of the trays 80*y* to 80*k* is an example of a fourth support member. This numbering is merely used for the sake of convenience of description, and can be interchanged appropriately in principle.

The developing units 50*y*, 50*m*, 50*c*, and 50*k* serving as first to fourth developing units are examples of developing means or developing portions that each develop (visualize) an electrostatic latent image formed on the photosensitive drum 2 into a toner image by using toner of a corresponding color. The developing units 50*y*, 50*m*, 50*c*, and 50*k* each develop the electrostatic latent image formed on the photosensitive drum 2 by using corresponding one of yellow toner, magenta toner, cyan toner, and black toner. The developing units 50*y*, 50*m*, 50*c*, and 50*k* may be arranged in an order different from the order illustrated in FIG. 1.

The developing unit 50*y* includes a developing roller 51*y*, a supply roller 52*y*, and a developing blade. The developing roller 51*y* is a developer bearing member that rotates while bearing toner serving as developer or developing agent, and supplies the toner to the photosensitive drum 2. The supply roller 52*y* is a supply member that is disposed in contact with the developing roller 51*y* and supplies toner to the developing roller 51*y*. The developing blade is a regulation member that regulates the thickness of a toner layer borne on the developing roller 51*y*. The other developing units 50*m*, 50*c*, and 50*k* respectively include developing rollers 51*m*, 51*c*, and 51*k*, supply rollers 52*m*, 52*c*, and 52*k*, and developing blades that are configured in a similar manner.

The toner cartridges 70*y*, 70*m*, 70*c*, and 70*k* corresponding to the developing units 50*y*, 50*m*, 50*c*, and 50*k* are attached to the rotary body 90. The toner cartridges 70*y*, 70*m*, 70*c*, and 70*k* respectively store therein yellow toner, magenta toner, cyan toner, and black tonner to be supplied to the developing units 50*y*, 50*m*, 50*c*, and 50*k*. One of the toners of four colors may be referred to as first toner, one of the toners of remaining three colors may be referred to as second toner, one of the toners of remaining two colors may be referred to as third toner, and the toner of the last remaining color may be referred to as fourth toner. For example, the black toner may be referred to as an example of first toner, and the magenta toner may be referred to as an example of second toner. This numbering is merely used for the sake of convenience of description, and can be interchanged appropriately in principle.

Here, the rotary body 90 includes a rotary frame 90*f* supporting the developing units 50*y*, 50*m*, 50*c*, and 50*k*. The developing units 50*y*, 50*m*, 50*c*, and 50*k* are supported by the rotary frame 90*f* that is a rotary support member that is rotatable.

In addition, the trays 80*y*, 80*m*, 80*c*, and 80*k* are attached to the rotary body 90. The rotary body 90 and the trays 80*y*, 80*m*, 80*c*, and 80*k* as a combination can be referred to as a rotary unit 90U. In other words, the rotary unit 90U includes the rotary body 90 and the trays 80*y*, 80*m*, 80*c*, and 80*k*.

The toner cartridges 70*y* to 70*k* are detachably held by the trays 80*y* to 80*k*. As will be described later, the trays 80*y* to 80*k* are supported so as to be slidable to the outside of the rotary body 90. The rotary unit 90U and the toner cartridges 70*y*, 70*m*, 70*c*, and 70*k* as combined can be referred to as a rotary assembly 90A. In other words, the rotary assembly 90A includes the rotary unit 90U and toner cartridges 70*y*, 70*m*, 70*c*, and 70*k*.

As will be described later, the rotary body 90 is rotatable about a rotational axis (rotational center) 90C. The rotational axis 90C coincides with a rotational axis of the rotary frame 90*f*, that of the rotary unit 90U, and that of the rotary assembly 90A. In addition, the rotational axis 90C is substantially parallel to the rotational axis (rotational center) of the photosensitive drum 2.

The rotary body 90 rotates about the rotational axis 90C, and thus can take developing postures in each of which any one of the developing rollers 51*y*, 51*m*, 51*c*, and 51*k* faces the photosensitive drum 2. A posture in which the developing roller 51*y* faces the photosensitive drum 2 will be referred to as a yellow developing posture. A posture in which the developing roller 51*m* faces the photosensitive drum 2 will be referred to as a magenta developing posture. A posture in which the developing roller 51*c* faces the photosensitive drum 2 will be referred to as a cyan developing posture. A posture in which the developing roller 51*k* faces the photosensitive drum 2 will be referred to as a black developing posture. That is, the rotary body 90 can rotate about the rotational axis 90C such that the positions of the developing rollers 51*y*, 51*m*, 51*c*, and 51*k* change with respect to the photosensitive drum 2. The black developing posture is an example of a first developing posture in which the first developing roller (e.g., developing roller 51*k*) faces the photosensitive drum 2. The other developing postures are examples of a second developing posture in which a second developing roller (e.g., one of the developing rollers 51*y* to 51*c*) faces the photosensitive drum 2. The yellow/magenta/cyan/black developing postures can be referred to as first to fourth developing postures. This numbering is merely used for the sake of convenience of description, and can be interchanged appropriately in principle.

As illustrated in FIG. 2, the apparatus body 1A includes a controller 17 and motors M1, M2, and M3 serving as drive sources. The controller 17 includes a central processing unit (CPU) configured to execute programs to control operations of the image forming apparatus 1, and a storage device, such as a read only memory (ROM), configured to store the programs and data.

As will be described later, the motor M1 supplies a driving force for rotating the rotary body 90 about the rotational axis 90C. In other words, the motor M1 rotates the rotary assembly 90A and the rotary unit 90U about the rotational axis 90C.

In addition, the apparatus body 1A includes a driving device 98 including the motor M2 and a transmission device 99. The transmission device includes driving racks 15L and 15R serving as driving gears and a transmission member 15*t* that will be described later. The driving force of the motor M2 is transmitted to the driving racks 15L and 15R. In other words, the motor M2 is configured to drive the driving racks 15L and 15R, and moves the trays 80*y*, 80*m*, 80*c*, and 80*k* with respect to the rotary body 90 via the driving racks 15L and 15R.

The motor M3 drives members that are not driven by the motors M1 and M2. For example, the motor M3 drives the photosensitive drum 2, the developing units 50*y*, 50*m*, 50*c*, and 50*k*, the pickup roller 310, the feed roller 311, the conveyance roller pair 320, the secondary transfer roller 12, the belt driving roller 10*b*, and the fixing device 40.

To be noted, the members driven by the motors M1, M2, and M3 can be appropriately changed. In addition, the roles of two or three of the motors M1, M2, and M3 can be concentrated in one motor. In addition, a drive source other than the motors M1, M2, and M3 may be added.

Here, the suffices y, m, c, and k given to the developing units 50*y*, 50*m*, 50*c*, and 50*k*, the toner cartridges 70*y*, 70*m*, 70*c*, and 70*k*, the trays 80*y*, 80*m*, 80*c*, and 80*k*, and the like indicate the colors of toner. The developing units 50*y*, 50*m*, 50*c*, and 50*k* basically have the same configuration and function. The toner cartridges 70*y*, 70*m*, 70*c*, and 70*k* basically have the same configuration and function. In addition, the trays 80*y*, 80*m*, 80*c*, and 80*k* basically have the same configuration and function. Therefore, in the case where these do not need to be distinguished, the suffices y, m, c, and k will be omitted, and arbitrarily selected one of the four units, four cartridges, and four trays will be described.

As illustrated in FIG. 3, the toner cartridge 70 includes a toner frame 71. The toner frame 71 includes a toner storage portion 71*a* that stores toner, and a discharge opening 71*b* communicating with the toner storage portion 71*a*.

The developing unit 50 includes a developing frame 53 serving as a storage frame. The developing frame 53 includes a developing-side storage portion 53*a* and an inlet opening 53*b* communicating with the developing-side storage portion (toner supply chamber) 53*a*. To be noted, as described above, although the developing unit 50 includes the developing roller 51, the supply roller 52, and the like, illustration of these members is omitted in FIG. 3.

Figure 4A:
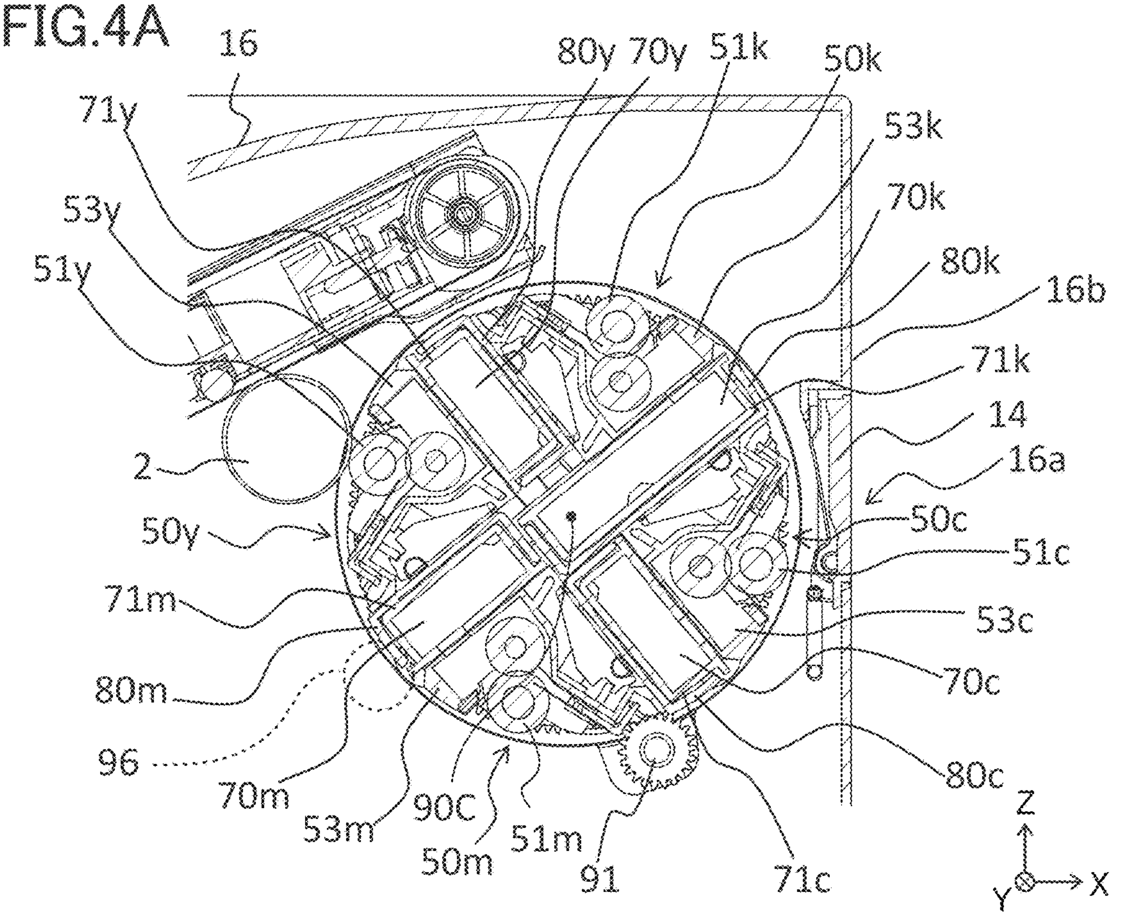
FIGS. 4A and 4B are each a section view of the image forming apparatus according to the first embodiment.

The developing roller 51*k* included in the developing unit 50*k* is an example of a first developing roller. The developing roller 51*m* included in the developing unit 50*m* is an example of a second developing roller. A developing frame 53*k* of the developing unit 50*k* including the developing-side storage portion 53*a* illustrated in FIG. 4A is an example of a first storage frame including a first storage portion. A developing frame 53*m* of the developing unit 50*m* including the developing-side storage portion 53*a* illustrated in FIG. 4A is an example of a second storage frame including a second storage portion. The rotary body 90 is an example of a rotary that is rotatable and includes a first developing roller, a second developing roller, a first storage frame including a first storage portion, and a second storage frame including a second storage portion. In the present embodiment, the rotary body 90 includes first to fourth developing rollers and first to fourth storage frames.

As will be described later, the toner cartridge 70 is movable to an attached position and a retracted position where the toner cartridge 70 is retracted from the attached position, with respect to the developing frame 53. In a state in which the toner cartridge 70 is at the attached position with respect to the developing frame 53, the discharge opening 71*b* faces the inlet opening 53*b*. That is, the toner storage portion 71*a* of the toner cartridge 70 and the developing-side storage portion 53*a* of the developing unit 50 communicate with each other via the discharge opening 71*b* and the inlet opening 53*b*. When toner is supplied from the toner cartridge 70 to the developing unit 50, at least part of the inlet opening 53*b* is positioned below at least part of the discharge opening 71*b*.

Then, toner stored in the toner storage portion 71*a* is discharged through the discharge opening 71*b*, and the toner discharged through the discharge opening 71*b* is stored in the developing-side storage portion 53*a* through the inlet opening 53*b*. The toner stored in the developing-side storage portion 53*a* is supplied to the developing roller 51 by the supply roller 52. The toner stored in the toner storage portion 71*a* is supplied to the developing roller 51 through such a path.

The toner cartridge 70 preferably includes an unillustrated sealing member (first sealing member) that covers the discharge opening 71*b*. In addition, the developing unit 50 preferably includes an unillustrated sealing member (second sealing member) that covers the inlet opening 53*b*.

In a state in which the toner cartridge 70 is not attached to the developing unit 50, the discharge opening 71*b* and the inlet opening 53*b* are preferably each covered by a sealing member such that leakage of toner through the discharge opening 71*b* and the inlet opening 53*b* is suppressed.

Image Forming Operation

An image forming operation in the present embodiment will be described. First, the photosensitive drum 2 is rotated in an arrow direction (counterclockwise direction) in FIG. 1 in synchronization with the rotation of the intermediate transfer belt 10*a*. Further, the surface of the photosensitive drum 2 is uniformly charged by the charging roller 3.

In the case of forming a color image on the sheet S, the rotary body 90 rotates in an arrow direction (clockwise direction) in FIG. 1 while supporting the developing units 50*y*, 50*m*, 50*c*, and 50*k*. Then, an electrophotographic process is repeatedly performed while moving the developing rollers 51*y*, 51*m*, 51*c*, and 51*k* to a developing position one by one.

First, the scanner 4 emits laser light based on image data corresponding to a yellow image, and thus forms an electrostatic latent image corresponding to the yellow image on the surface of the photosensitive drum 2. In parallel with the formation of this electrostatic latent image, the motor M1 rotates the rotary body 90, and the rotary body 90 takes the yellow developing posture. When the rotary body 90 is in the yellow developing posture, the developing roller 51*y* is in the developing position, and the electrostatic latent image formed on the photosensitive drum 2 is developed with yellow toner.

Here, in the present embodiment, the developing rollers 51*y*, 51*m*, 51*c*, and 51*k* are each an elastic roller formed by covering a metal shaft with rubber. At the developing position, the developing rollers 51*y*, 51*m*, 51*c*, and 51*k* each develop the electrostatic latent image in a state of being in contact with the photosensitive drum 2. That is, a contact development system is employed for the image forming apparatus 1 of the present embodiment. However, at the developing position, each of the developing rollers 51*y*, 51*m*, 51*c*, and 51*k* may develop the electrostatic latent image with a gap between the developing roller and the photosensitive drum 2. That is, a non-contact development system may be employed for the image forming apparatus 1.

After the yellow toner image is developed, the yellow toner image on the photosensitive drum 2 is transferred onto the intermediate transfer belt 10*a* through primary transfer by the primary transfer roller 11 disposed on the inner peripheral side of the intermediate transfer belt 10*a*.

After this, toner images of respective colors are formed by rotating the rotary body 90 and thus sequentially moving the developing rollers 51*m*, 51*c*, and 51*k* to the developing position. That is, after the yellow toner image is formed on the intermediate transfer belt 10*a*, the rotary body 90 takes a magenta developing posture, and a magenta toner image is formed on the intermediate transfer belt 10*a*. After the magenta toner image is formed on the intermediate transfer belt 10*a*, the rotary body 90 takes a cyan developing posture, and a cyan toner image is formed on the intermediate transfer belt 10*a*. After the cyan toner image is formed on the intermediate transfer belt 10*a*, the rotary body 90 takes a black developing posture, and a black toner image is formed on the intermediate transfer belt 10*a*. After the black toner image is formed on the intermediate transfer belt 10*a*, the rotary body 90 rotates about the rotational axis 90C in an arrow direction (clockwise direction) illustrated in FIG. 1, and returns to the yellow developing posture. To be noted, the color of the image to be formed first on the intermediate transfer belt 10*a* can be arbitrarily selected, and for example, the black toner image may be formed first.

Then, primary transfer is repeated so as to superimpose the toner images of four colors on each other on the intermediate transfer belt 10*a*, and thus a color image is formed on the intermediate transfer belt 10*a*. To be noted, before the color image is formed on the intermediate transfer belt 10*a*, the secondary transfer roller 12 and the cleaning device 13 are not in contact with the intermediate transfer belt 10*a*.

Meanwhile, the sheet S is fed by the pickup roller 310 from the sheet storage portion 300 provided in a lower portion of the apparatus body 1A. The sheet S is conveyed to the conveyance roller pair 320 in a state in which one sheet S is separated from a stack of sheets S by the feed roller 311 and the separation roller 312. The conveyance roller pair 320 delivers out the fed sheet S to a transfer portion (secondary transfer portion) that is a nip portion between the intermediate transfer belt 10*a* and the secondary transfer roller 12. The color image on the intermediate transfer belt 10*a* is transferred onto the surface of the conveyed sheet S through secondary transfer.

The sheet S onto which a color image has been transferred is conveyed to the fixing device 40. In the fixing device 40, the sheet S is heated and pressurized, and thus the image is fixed to the sheet S. The sheet S having passed the fixing device 40 is discharged to the outside of the image forming apparatus 1 as a product.

In contrast, in the case of forming a black-and-white image (monochrome image) on the sheet S, the rotary body 90 takes the black developing posture. In this state, an electrostatic latent image is formed on the surface of the photosensitive drum 2 by charging and exposing the photosensitive drum 2, and then the electrostatic latent image is developed with black toner by the developing roller 51*k* positioned at the developing position. The black toner image is transferred onto the intermediate transfer belt 10*a* through primary transfer, and then the toner image is transferred onto the sheet S through secondary transfer. Steps after this are similar to the case of a color image.

Rotary Configuration

Figure 4B:
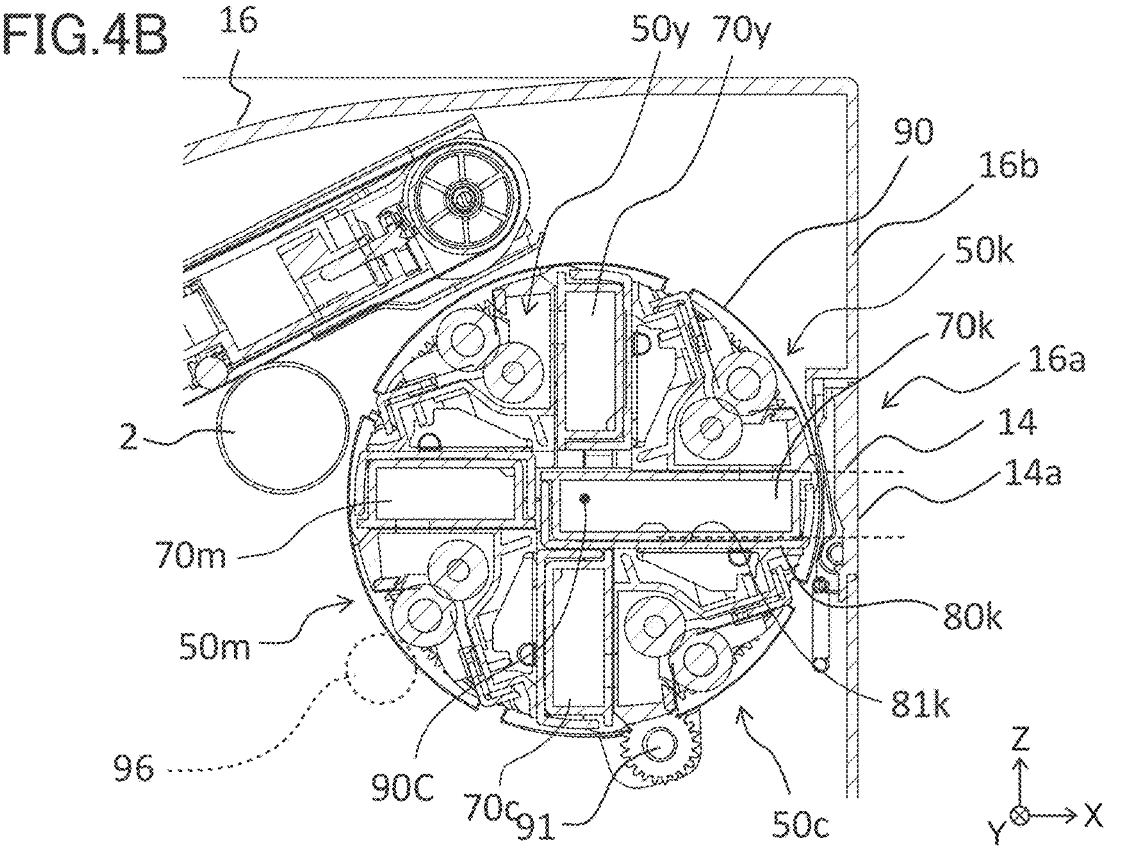
Figure 5:
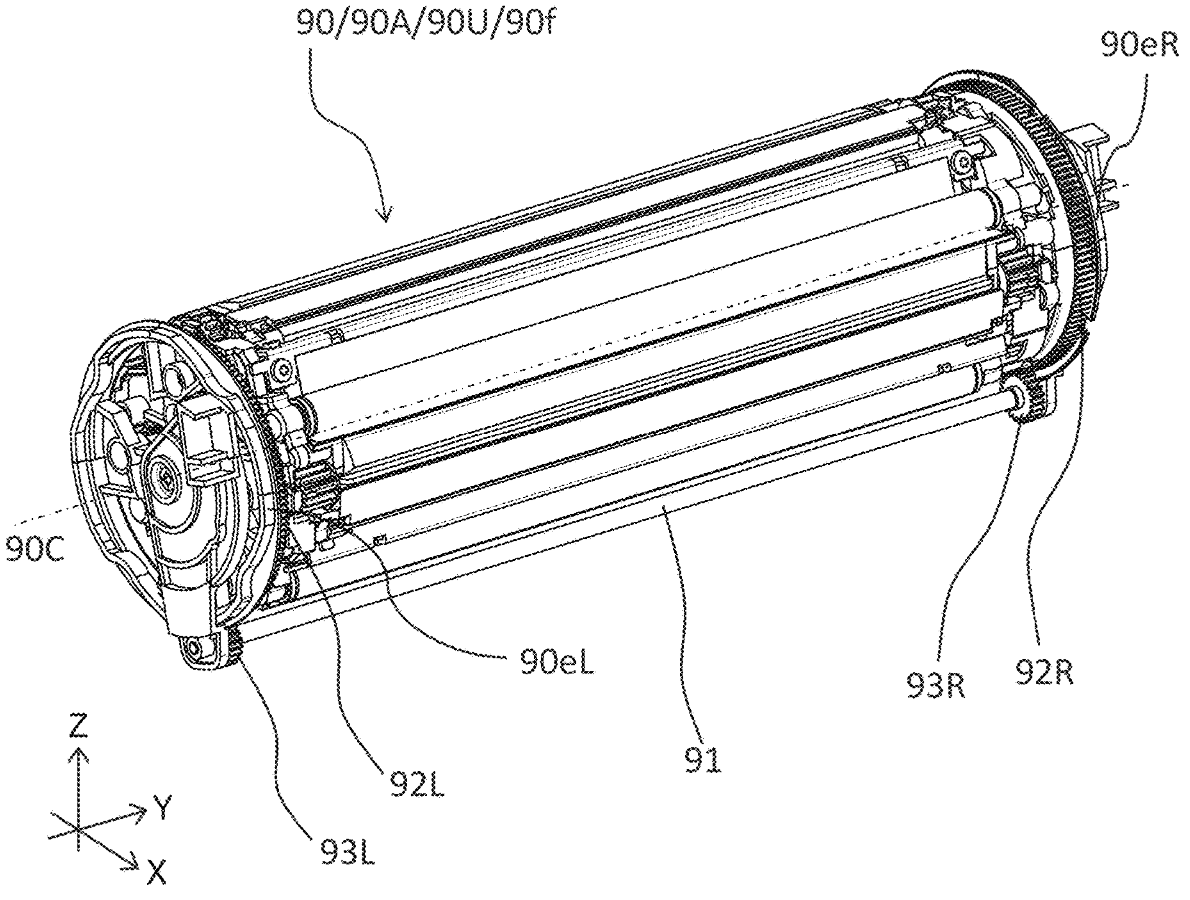
FIG. 5 is a perspective view of a rotary body according to the first embodiment.

The configuration of the rotary body 90 will be described with reference to FIGS. 1, 4A, 4B, and 5. FIGS. 4A and 4B are each a section view of the rotary body 90 of the image forming apparatus 1 and the surroundings thereof. To be noted, FIGS. 4A and 4B are each a section view taken along a virtual plane orthogonal to the rotational axis 90C of the rotary body 90. FIG. 5 is a perspective view of the rotary body 90.

As has been described, the toner cartridges 70*y* to 70*k* are attachable to and detachable from the rotary body 90. In the case where toner in the toner cartridges 70*y* to 70*k* has run out, the user can replenish the image forming apparatus 1 with toner by replacing the toner cartridges 70*y* to 70*k*.

As illustrated in FIG. 1, the apparatus body 1A includes a frame 16 accommodating the rotary body 90. The frame 16 is a body frame of the image forming apparatus 1 of the present embodiment. The frame 16 is a casing or skeleton of the apparatus body 1A constituted by a frame and exterior members, and has an approximately rectangular parallelepiped shape.

The frame 16 has an opening 16*a*. More specifically, the frame 16 has a side surface 16*b* extending in a direction intersecting with the horizontal direction. The side surface 16*b* constitutes at least part of the exterior surface of the apparatus body 1A on the +X side. The opening 16*a* is provided in the side surface 16*b*. The side surface 16*b* is a side surface disposed on the downstream side of the discharge port in a discharge direction in which the sheet S on which an image has been formed is discharged from the apparatus body 1A through the discharge port. From the side surface 16*b* side of the image forming apparatus 1, the user can access the sheet storage portion 300 to replenish the sheet storage portion 300 with sheets S, and can obtain the sheet S discharged through the discharge port. Therefore, the side surface 16*b* can be referred to as the front surface of the apparatus body 1A.

The toner cartridges 70*y*, 70*m*, 70*c*, and 70*k* are attachable to and detachable from the rotary body 90 through the opening 16*a*. That is, the toner cartridge 70*k* can be referred to as an example of a first toner cartridge that stores toner to be supplied to the first developing roller (developing roller 51*k*) and that is attachable to and detachable from the rotary (rotary body 90) through the opening 16*a* of the frame 16 of the apparatus body 1A. The toner cartridge 70*m* can be referred to as an example of a second toner cartridge that stores toner to be supplied to the second developing roller (developing roller 51*m*) and that is attachable to and detachable from the rotary (rotary body 90) through the opening 16*a* of the frame 16 of the apparatus body 1A.

In the present embodiment, the toner cartridges 70*y*, 70*m*, 70*c*, and 70*k* are attached to and detached from the rotary body 90 through the opening 16*a* in the state of being supported by the trays 80*y* to 80*k*. In other words, the user can attach and detach the toner cartridges 70*y* to 70*k* to and from the rotary body 90 via the trays 80*y* to 80*k*.

The opening 16*a* is disposed in the side surface 16*b* of the frame 16. In the present embodiment, the side surface 16*b* is a surface approximately parallel to the rotational axis 90C of the rotary body 90. Therefore, in the case of replacing the toner cartridge 70, the toner cartridge 70 passes through the opening 16*a* in a direction intersecting with the rotational axis 90C (preferably a direction orthogonal to the rotational axis 90C).

The image forming apparatus 1 includes a door 14 that covers the opening 16*a* of the frame 16. The door 14 is an opening/closing member movable to a closed position illustrated in FIG. 6A where the door 14 covers the opening 16*a* and an open position illustrated in FIGS. 6B and 6C where the opening 16*a* is exposed.

As described above, in the present embodiment, the toner cartridge 70 is configured to be attachable to and detachable from the rotary body 90 via the tray 80. Therefore, the toner cartridge 70 can be stably attached to and detached from the rotary body 90.

More specifically, the user can replace the toner cartridge 70 by an operation of attaching and detaching the toner cartridge 70 to and from the tray 80 configured to be movable with respect to the rotary body 90 (that is, with respect to the apparatus body 1A). In the case of a configuration in which the toner cartridge is replaced by the user directly inserting and removing the toner cartridge in and from the apparatus body, the user is required to insert the toner cartridge to a predetermined attached position in the apparatus body. In the present embodiment, the tray 80 is capable of moving such that the toner cartridge 70 moves to the attached position in a state in which the tray 80 is supporting the toner cartridge 70. Therefore, the user can replace the toner cartridge 70 by a simple operation of placing the toner cartridge 70 on the tray 80, and thus the operability is improved.

To be noted, the toner cartridge 70 has a thin elongated shape with the Y direction parallel to the rotational axis 90C of the rotary body 90 as a longitudinal direction. That is, the dimension of the toner cartridge 70 in the longitudinal direction is larger than its height and width in a cross-section orthogonal to the longitudinal direction. In the case of using the toner cartridge 70 having a thin elongated shape as described above, the toner cartridge 70 can be passed through the opening 16*a* in a short movement distance by providing the opening 16*a* in the side surface 16*b* of the frame 16 that is approximately parallel to the longitudinal direction (Y direction) of the toner cartridge 70. The replacement of the toner cartridge 70 becomes easier than, for example, a case where the toner cartridge 70 is inserted or removed through an opening provided in a side surface on one side (+Y side or −Y side) of the frame 16 in the longitudinal direction of the toner cartridge 70.

The rotary body 90 rotates about the rotational axis 90C, and thus can take a replacement posture in which detachment of one of the toner cartridges 70*y* to 70*k* from the rotary body 90 is allowed. A posture in which the detachment of the toner cartridge 70*y* is allowed will be referred to as a yellow replacement posture. A posture in which the detachment of the toner cartridge 70*m* is allowed will be referred to as a magenta replacement posture. A posture in which the detachment of the toner cartridge 70*c* is allowed will be referred to as a cyan replacement posture. A posture in which the detachment of the toner cartridge 70*k* is allowed will be referred to as a black replacement posture. The black replacement posture is an example of a first replacement posture in which detachment of a first toner cartridge from the rotary body 90 is allowed. The yellow/magenta/cyan replacement postures are examples of a second replacement posture in which detachment of a second toner cartridge from the rotary body 90 is allowed. The yellow/magenta/cyan/black replacement postures can be referred to as first to fourth replacement postures. This numbering is merely used for the sake of convenience of description, and can be interchanged appropriately in principle.

The rotary body 90 rotates about the rotational axis 90C in a counterclockwise direction of FIG. 1, and can sequentially take the yellow/magenta/cyan/black replacement postures. In the present embodiment, the rotary body 90 rotates about the rotational axis 90C in the counterclockwise direction of FIG. 1, and thus the developing posture and the replacement posture can be switched alternately. For example, in FIG. 1, the rotary body 90 is in the black developing posture. By rotating the rotary body 90 in the clockwise direction from this state, the posture of the rotary body 90 can be switched in the order of the cyan replacement posture, the yellow developing posture, the black replacement posture, the magenta developing posture, the yellow replacement posture, the cyan developing posture, and the magenta replacement posture. By rotating the rotary body 90 in the clockwise direction from the magenta replacement posture, the rotary body 90 returns to the black developing posture. That is, the rotary body 90 can rotate more than once (360°) in the clockwise direction.

FIG. 4A illustrates a cross-section of the rotary body 90 in a developing posture (specifically, the yellow developing posture). FIG. 4B illustrates a cross-section of the rotary body 90 in a replacement posture (specifically, the black replacement posture).

As illustrated in FIGS. 4A and 4B, the four trays 80*y* to 80*k* are attached to the rotary body 90. The trays 80*y* to 80*k* respectively hold the toner cartridges 70*y* to 70*k*. In FIGS. 4A and 4B, the trays 80*y* to 80*k* are accommodated in the rotary body 90, and this state can be referred to as a state in which the toner cartridges 70*y* to 70*k* are attached to the developing units 50*y*, 50*m*, 50*c*, and 50*k*.

As described above, the toner cartridge 70 is movable to an attached position and a retracted position where the toner cartridge 70 is retracted from the attached position, with respect to the developing frame 53 of the developing unit 50. That is, the first toner cartridge (toner cartridge 70*k*) is movable to a first attached position and a first retracted position with respect to a first storage frame (developing frame 53*k*). The second toner cartridge (toner cartridge 70*m*) is movable to a second attached position and a second retracted position with respect to a second storage frame (developing frame 53*m*).

In a state in which the toner cartridge 70 is at the attached position with respect to the developing frame 53, the discharge opening 71*b* and the inlet opening 53*b* face each other as illustrated in FIG. 3. The toner cartridge 70 is configured to supply toner to the developing-side storage portion 53*a* through the inlet opening 53*b* (opening of the storage frame) in this state.

The apparatus body 1A includes a moving device 85 configured to move the toner cartridge 70 from the attached position to the retracted position with respect to the rotary body 90 (more specifically, with respect to the developing frame 53 of the developing unit 50). The moving device 85 will be described below with reference to FIG. 8 and the like. In the present embodiment, a plurality of moving devices 85*y* to 85*k* corresponding to the plurality of toner cartridges 70*y* to 70*k* are disposed in the rotary body 90. The trays 80*y* to 80*k* can be referred to as part of the moving devices 85*y* to 85*k*.

In the present embodiment, the toner cartridge 70*k* storing the black toner is larger in size than the toner cartridges 70*y* to 70*c* storing yellow toner, magenta toner, and cyan toner, and is capable of storing more toner. In other words, the first toner cartridge is capable of storing a first amount of toner, the second toner cartridge is capable of storing a second amount of toner, and the first amount is larger than the second amount.

Specifically, the length of the black toner cartridge 70*k* in a first radial direction with respect to the rotational axis 90C of the rotary body 90 is larger than the length of the magenta toner cartridge 70*m* in a second radial direction. Here, the first radial direction is a rotational radius direction (radial direction of a virtual circle centered on the rotational axis 90C) of the rotary body 90, and is a direction in which the toner cartridge 70*k* extends with respect to the rotational axis 90C as viewed in the direction of the rotational axis 90C. The second radial direction is a rotational radius direction of the rotary body 90, and is a direction in which the toner cartridge 70*m* extends with respect to the rotational axis 90C as viewed in the direction of the rotational axis 90C. Similarly, the length of the black toner cartridge 70*k* in the first radial direction is larger than the lengths of the other toner cartridges 70*y* and 70*c* in the radial directions corresponding to the toner cartridges 70*y* and 70*c*.

Accordingly, the tray 80*k* holding the black toner cartridge 70*k* is larger in size than the trays 80*y* to 80*c* holding the other toner cartridges 70*y*, 70*m*, and 70*c*. That is, the four toner cartridges 70*y* to 70*k* and the trays 80*y* to 80*k* having different sizes are disposed in the rotary body 90. In other words, the toner cartridge 70*k* serving as an example of a first toner cartridge and the toner cartridge 70*y* serving as an example of a second toner cartridge smaller than the first toner cartridge are attachable to and detachable from the rotary body 90. In accordance with this, the tray 80*k* serving as an example of a first support member that supports the first toner cartridge and the tray 80*y* serving as an example of a second support member smaller than the first support member are provided in the rotary body 90. In addition, the toner cartridges 70*m* and 70*c* serving as examples of a third toner cartridge and a fourth toner cartridge that are smaller in size than the first toner cartridge are attachable to and detachable from the rotary body 90. In accordance with this, the trays 80*m* and 80*c* serving as examples of a third support member and a fourth support member that are smaller in size than the first support member are provided in the rotary body 90.

Here, rotational driving of the rotary body 90 will be described with reference to FIG. 5. As illustrated in FIG. 5, disk gears 92L and 92R are formed on respective end portions of the rotary body 90. In addition, rotary driving gears 93L and 93R are formed on respective end portions of a swing shaft 91 in a manner capable of transmitting a driving force. Here, the driving force of the motor M1 is transmitted to the rotary driving gear 93R via a drive transmission mechanism. Next, the driving force is transmitted to the disk gears 92L and 92R via the rotary driving gears 93L and 93R, and thus the rotary body 90 is rotationally driven. The rotary body 90 rotates about the rotational axis 90C in the clockwise direction in FIG. 1.

In addition, the rotary body 90 is supported so as to be swingable about the swing shaft 91. The rotary body 90 is urged in a counterclockwise direction in FIGS. 4A and 4B about the swing shaft 91 by an unillustrated urging member. This direction can be referred to as a direction in which the developing rollers 51*y* to 51*k* each approach the photosensitive drum 2. As a result of this, one of the developing rollers 51*y* to 51*k* is in contact with the photosensitive drum 2 in a state in which the rotary body 90 is in a developing posture.

Meanwhile, as illustrated in FIG. 5, rotary cams 90*e*L and 90*e*R are provided on respective end portions of the rotary body 90. When the rotary body 90 rotates about the rotational axis 90C in a clockwise direction in FIGS. 4A and 4B, the rotary cams 90*e*L and 90*e*R come into contact with a roller 96 supported by the frame 16 illustrated in FIGS. 4A and 4B. Then, the rotary body 90 moves in the clockwise direction in FIGS. 4A and 4B about the swing shaft 91. This direction can be referred to as a direction in which the developing rollers 51*y* to 51*k* each move away from the photosensitive drum 2. In addition, this direction can be referred to as a direction in which the rotary body 90 approaches the opening 16*a* of the frame 16 and the door 14.

As a result of this, when the rotary body 90 rotates and switches from the developing posture to the replacement posture, the rotary body 90 swings about the swing shaft 91. In a state in which the rotary body 90 is in the replacement posture, the developing roller 51 is separated from the photosensitive drum 2.

As illustrated in FIG. 4B, in the black replacement posture, the toner cartridge 70*k* stops at a position where the toner cartridge 70*k* faces the opening 16*a* and the door 14 provided on the side surface 16*b* of the apparatus body 1A. When the tray 80*k* is slid from the attached position for the developing unit 50*k* to the outside of the rotary body 90 from this state, the user can replace the toner cartridge 70*k*.

Replacement Operation of Toner Cartridge

Figure 6A:
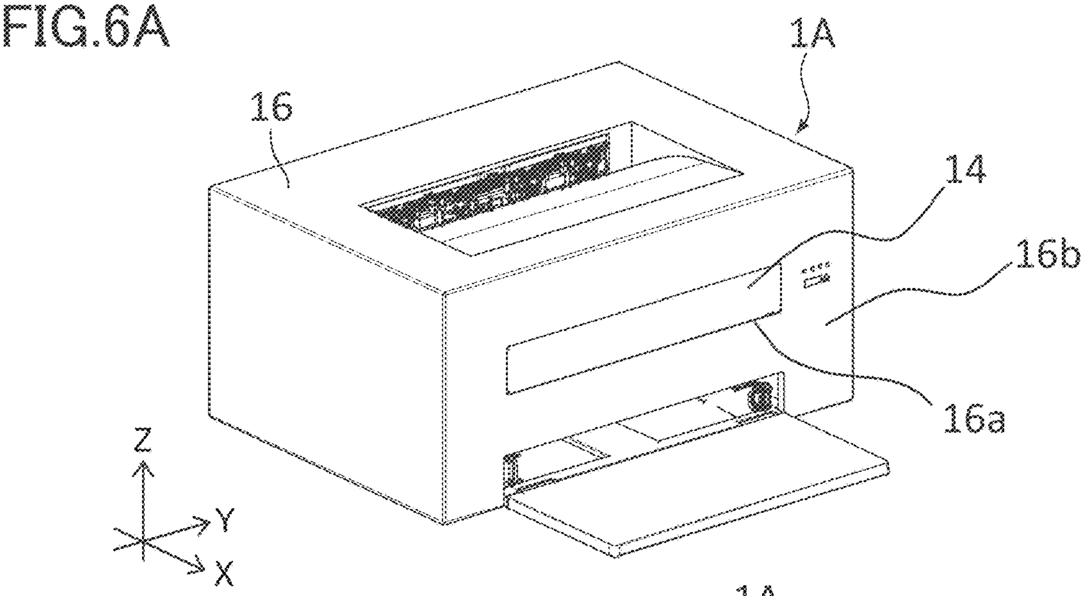
FIGS. 6A to 6C are each a perspective view of the image forming apparatus according to the first embodiment.
Figure 6B:
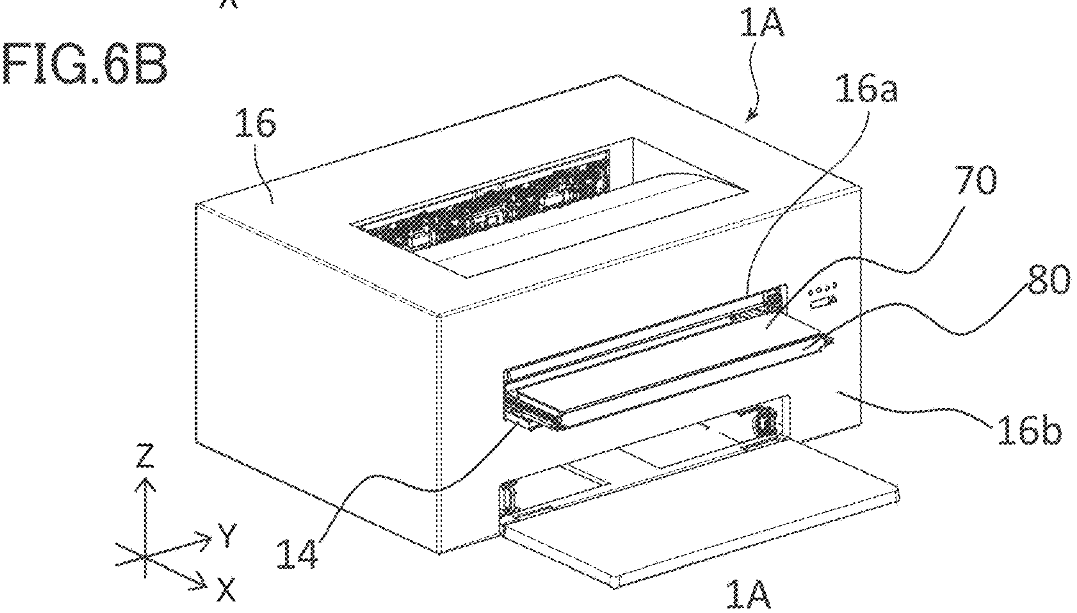
Figure 6C:
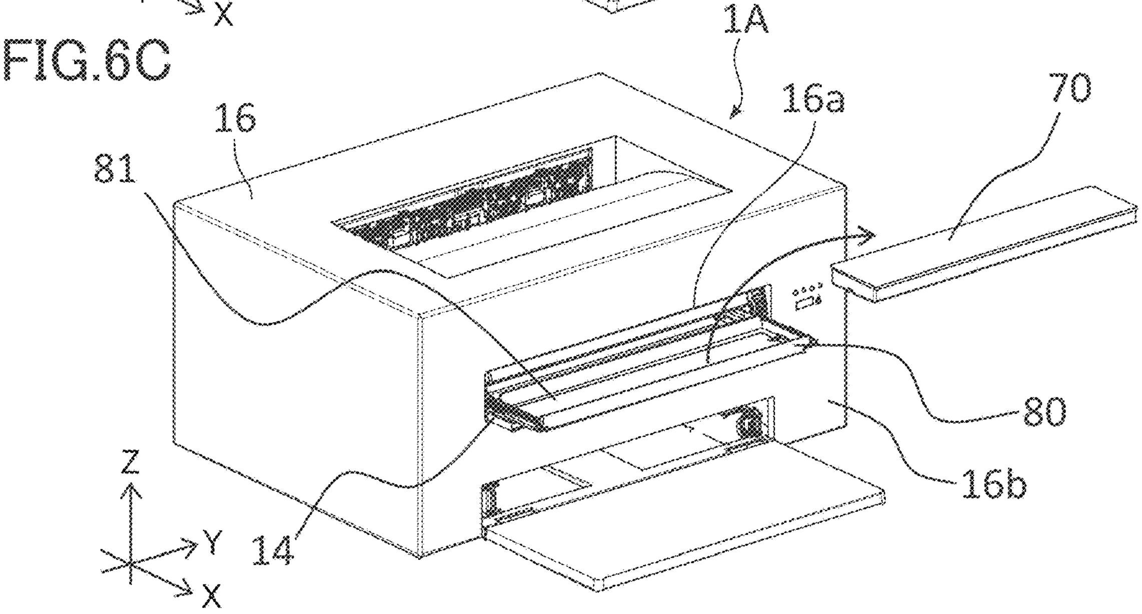
Figure 7A:
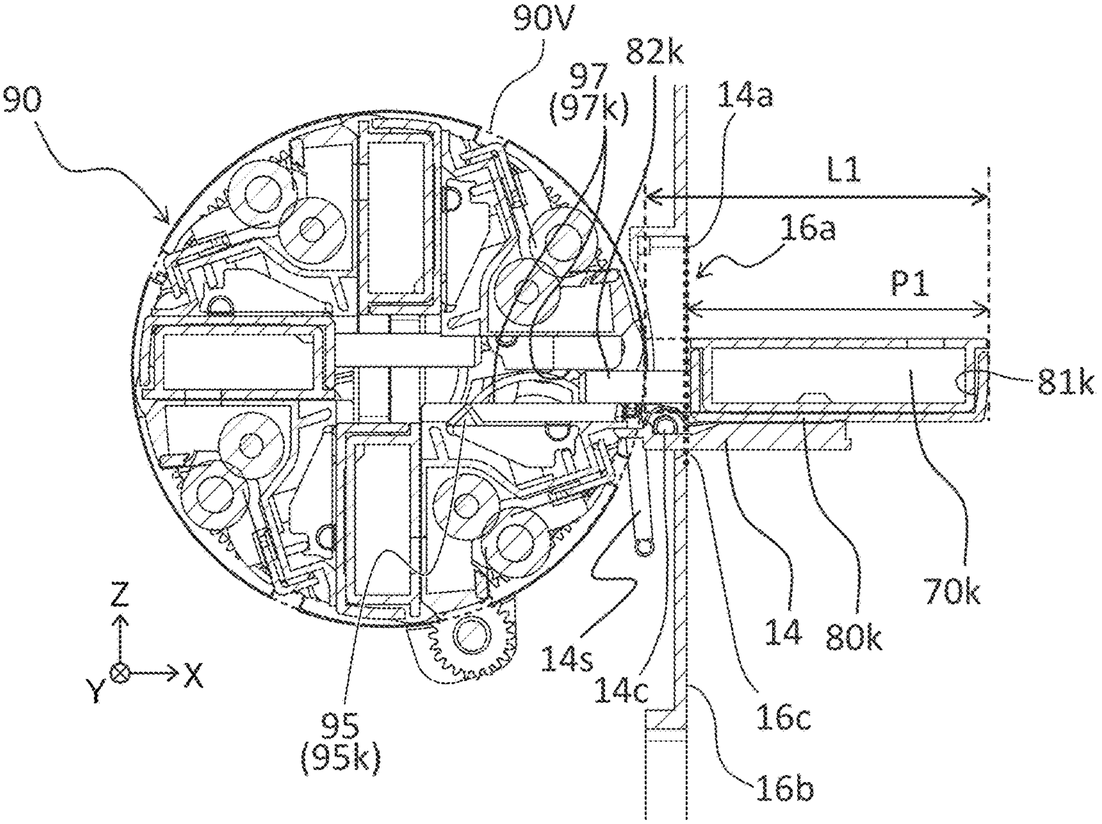
FIGS. 7A and 7B are each a section view of the image forming apparatus according to the first embodiment.
Figure 7B:
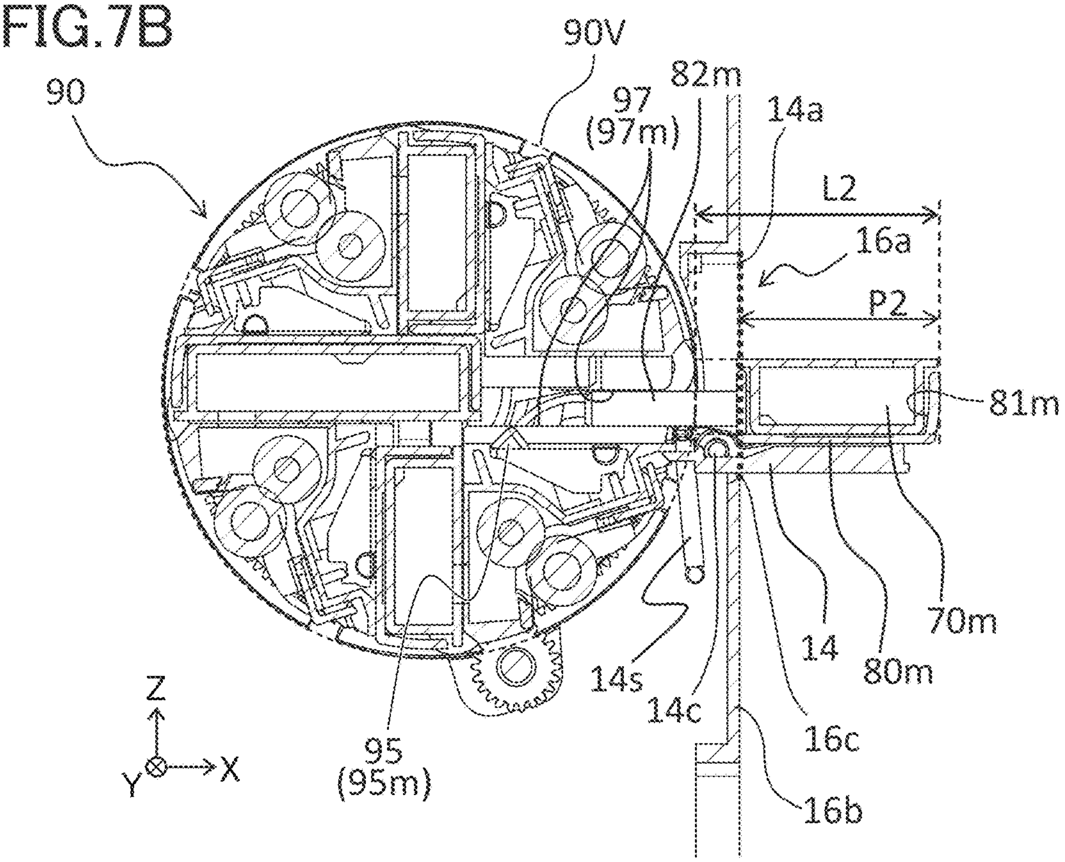

A toner cartridge replacement operation will be described with reference to FIGS. 4A, 6A to 6C, 7A, and 7B. FIGS. 6A to 6C are each an exterior view of the apparatus body 1A. FIGS. 7A and 7B are each a section view of the rotary body 90 and the surroundings thereof in toner cartridge replacement. To be noted, FIGS. 7A and 7B are each a section view of the apparatus taken along a virtual plane orthogonal to the rotational axis 90C of the rotary body 90.

FIG. 6A illustrates an external appearance of the apparatus body 1A during the image forming operation and in a standby state. During the image forming operation is during a period in which a series of operations of the image forming apparatus 1 feeding a sheet S, forming an image on the sheet S, and then discharging the sheet S as a product are executed. The standby state is a state in which the image forming operation can be started if the image forming apparatus 1 receives an image forming instruction (printing instruction), and a state in which the image forming apparatus 1 is standing by for the image forming instruction from the user. As illustrated in FIG. 6A, the door 14 is closed during the image forming operation and in the standby state.

FIG. 6B illustrates the external appearance of the apparatus body 1A at the time of toner cartridge replacement. At the time of toner cartridge replacement, the door 14 is opened, and the tray 80 and the toner cartridge 70 are moved to the outside of the apparatus body 1A.

The toner cartridge 70 is movable to an attached position and a retracted position where the toner cartridge 70 is retracted from the attached position, with respect to the developing frame 53 of the developing unit 50. In a state in which the toner cartridge 70 is at the attached position with respect to the developing frame 53, the discharge opening 71*b* and the inlet opening 53*b* face each other as illustrated in FIG. 3. As illustrated in FIGS. 4A and 4B, the rotary body 90 is configured to rotate about the rotational axis 90C to take the developing posture and the replacement posture in a state in which the toner cartridge 70 is at the attached position.

The toner cartridge replacement operation will be described. First, the user instructs the controller of the apparatus body 1A a toner cartridge replacement operation. The instruction of toner cartridge replacement operation is given by, for example, input via an operation panel (operation portion) provided on the apparatus body 1A.

When the controller receives the instruction of the toner cartridge replacement operation, the rotary body 90 rotates to the replacement posture of the toner cartridge 70 serving as a replacement target (toner cartridge 70 whose toner has run out), and stops. That is, the controller rotates the rotary body 90 to the replacement posture of a toner cartridge specified in the instruction of the toner cartridge replacement (in FIG. 4B, the black replacement posture for replacing the black toner cartridge 70*k*). In the replacement posture, the tray 80 supporting the toner cartridge 70 whose replacement has been instructed faces the opening 16*a* of the frame 16 of the apparatus body 1A.

For example, the rotary body 90 of FIG. 4A is in the yellow developing posture in which the yellow developing roller 51*y* faces the photosensitive drum 2. At this time, the black toner cartridge 70*k* and the tray 80*k* do not have to face the opening 16*a* and the door 14. In other words, the toner cartridge 70 and the tray 80 do not have to face the opening 16*a* and the door 14 in the case where the rotary body 90 is in a developing posture or a replacement posture other than the replacement posture of the toner cartridge. Therefore, the opening 16*a* may have such a size that each of the toner cartridges 70 can individually pass therethrough. When the rotary body 90 rotates in the clockwise direction in the drawings by a predetermined angle from the yellow developing posture, the black toner cartridge 70*k* and the tray 80*k* face the opening 16*a* and the door 14 as illustrated in FIG. 4B.

Here, "the tray 80 facing the opening 16*a*" means that the tray 80 is positioned so as to be able to move to the outside of the apparatus body 1A through the opening 16*a*. That is, in the case where the tray 80 faces the opening 16*a*, a moving mechanism that will be described later moves the tray 80 outward in the rotational radius direction of the rotary body 90, and therefore the tray 80 and the toner cartridge 70 supported by the tray 80 are capable of projecting to the outside of the apparatus body 1A. In FIG. 4A, none of the trays 80*y* to 80*k* faces the opening 16*a*. In FIG. 4B, only the black tray 80*k* faces the opening 16*a*, and the other trays 80*y* to 80*c* do not face the opening 16*a*.

When the rotary body 90 is positioned in the replacement posture, the motor M2 moves the tray 80 supporting the toner cartridge 70 serving as a replacement target to the outside of the apparatus body 1A. As a result of this, the toner cartridge 70 serving as a replacement target moves from the attached position to the retracted position with respect to the rotary body 90. In addition, as illustrated in FIGS. 6B, 6C, 7A, and 7B, the tray 80 and the toner cartridge 70 serving as a replacement target supported by the tray 80 projects to the outside of the apparatus body 1A through the opening 16*a*.

More specifically, the tray 80 is movable to an accommodation position and a detachment position with respect to the rotary body 90. The accommodation position is a position where the tray 80 is accommodated in the rotary body 90. The detachment position is a position (removal position or replaceable position) where the tray 80 projects to the outside of the rotary body 90 and the toner cartridge 70 can be detached from the tray 80. The positions of the trays 80*y* to 80*k* in FIGS. 4A and 4B serve as examples of the accommodation position. The position of the tray 80 in FIGS. 6B and 6C, the position of the tray 80*k* in FIG. 7A, and the position of the tray 80*m* in FIG. 7B serve as examples of the detachment position.

When the tray 80 is at the accommodation position, the toner cartridge 70 attached to the tray 80 is at the attached position. When the tray 80 is at the detachment position, the toner cartridge 70 attached to the tray 80 is at the retracted position.

Figure 8:
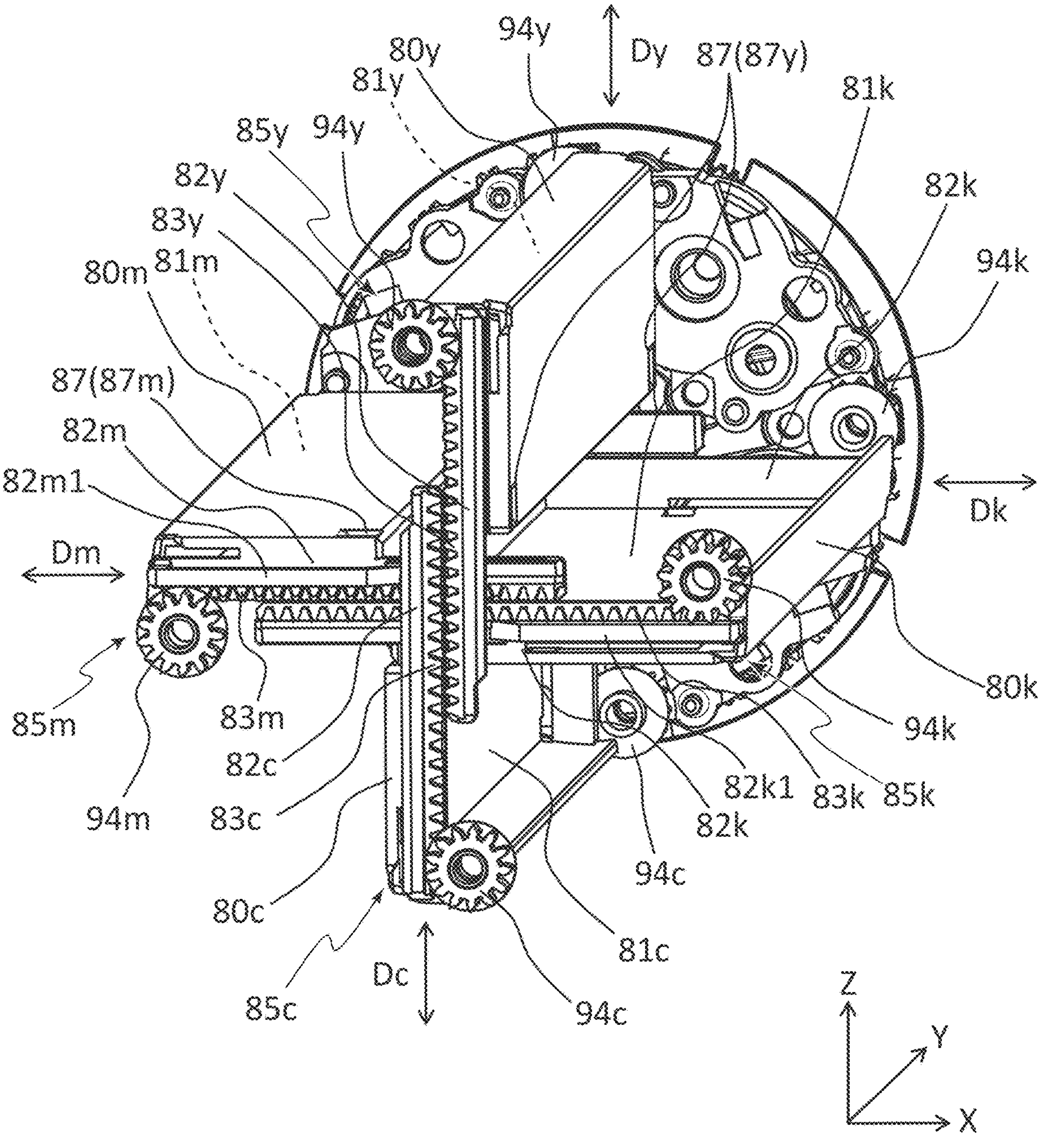
FIG. 8 is an explanatory diagram of the rotary body according to the first embodiment.

Here, as illustrated in FIGS. 7A and 7B, the rotary body 90 has projection portions 95 for holding the tray 80 at the accommodation position and holding the toner cartridge 70 at the attached position. As illustrated in FIG. 8, the tray 80 has recess portions 87 configured to be fit on the projection portions 95. FIGS. 7A and 7B illustrate projection portions 95*k* and 95*m* corresponding to the trays 80*k* and 80*m*, and FIG. 8 illustrates recess portions 87*y* and 87*m* of the trays 80*y* and 80*m*. The projection portion 95 and the recess portion 87 are provided for each of the trays 80*y* to 80*k*. The projection portion 95 is preferably urged in such a direction as to engage with the recess portion 87.

The projection portion 95 fits in the recess portion 87 of the tray 80, and thus the tray 80 is locked with respect to the rotary frame 90*f*. As a result of this, the tray 80 stays in the accommodation position even when the rotary body 90 rotates, and thus movement of the toner cartridge 70 from the attached position can be suppressed. To be noted, in the case where the tray 80 is moved between the accommodation position and the detachment position by the moving device that will be described below, the projection portion 95 can be configured to be moved by the tray 80 and thus disengaged from the recess portion 87.

In the present embodiment, the door 14 is supported so as to be pivotable with respect to the apparatus body 1A. As illustrated in FIG. 7A, the door 14 is urged from the open position to the closed position by a spring 14*s*. The spring 14*s* is, for example, a tension spring, and urges the door 14 such that a moment in a counterclockwise direction in FIGS. 7A and 7B is generated about a support shaft 14*c* of the door 14.

The tray 80 pushes the door 14, and thus the door 14 takes the open state illustrated in FIG. 6B. This state can be referred to as a state in which the tray 80 is supported by the door 14. The door 14 supports at least part of the tray 80 projecting to the outside of the apparatus body 1A, and thus the toner cartridge 70 can be supported more stably. In other words, when the first toner cartridge (toner cartridge 70*k*) is at the first retracted position, the opening/closing member (door 14) at the open position supports the first support member (tray 80*k*). In addition, when the second toner cartridge (one of the toner cartridges 70*y* to 70*c*) is at the second retracted position, the opening/closing member (door 14) at the open position supports the second support member (one of the trays 80*y* to 80*c*).

To be noted, the door 14 is configured such that the door 14 at the open position comes in contact with part (for example, a lower edge 16*c* of the opening 16*a*) of the frame 16 of the apparatus body 1A and not to pivot downward beyond the open position. When the tray 80 is pulled back into the apparatus body 1A from the outside, the door 14 returns to the closed position by the urging force of the spring 14*s*.

The toner cartridge 70 is detachably held by the tray 80. Therefore, as illustrated in FIG. 6C, the user can perform a work (replacement work) of detaching the toner cartridge 70 from the tray 80 and attaching a new toner cartridge 70. To be noted, in the case of replacing a plurality of toner cartridges 70, the replacement work can be performed by repeating the operation described above.

FIGS. 7A and 7B illustrate a cross-section of the rotary body 90 and the surroundings thereof at the time of toner cartridge replacement. FIG. 7A illustrates a state at the time of replacing the black toner cartridge 70*k*. FIG. 7B illustrates a state at the time of replacing the magenta toner cartridge 70*m*.

The image forming apparatus 1 includes the moving device 85 illustrated in FIG. 8 that moves the toner cartridge 70 from the attached position to the retracted position. In the present embodiment, it can be said that the moving device 85 includes the tray 80. A moving device 85*k* including the tray 80*k* can be referred to as an example of a first moving device including a first support member. A moving device 85*m* including the tray 80*m* can be referred to as an example of a second moving device including a second support member.

Even when the toner cartridge 70 is at the retracted position, the tray 80 is coupled to the rotary body 90 (supported by the rotary body 90). To easily detach the toner cartridge 70 from the rotary body 90, it is preferable that the length by which the toner cartridge 70 projects from the rotary body 90 at the retracted position is large. Since the toner cartridge 70 is configured to be attachable to and detachable from the rotary body 90 via the tray 80, the toner cartridge 70 can be stably supported by the tray 80 even in the case where the length by which the toner cartridge 70 projects from the rotary body 90 is large.

The movement direction of the toner cartridge 70 in which the toner cartridge 70 moves from the attached position to the retracted position will be referred to as a retraction direction. In the present embodiment, the retraction direction of the toner cartridge 70 is a direction intersecting with the direction of the rotational axis 90C (Y direction). Therefore, as illustrated in FIGS. 7A and 7B, as viewed in the direction of the rotational axis 90C (Y direction), the retraction direction of the toner cartridge 70 is a direction orthogonal to the direction of the rotational axis 90C (Y direction). In addition, the retraction direction of the toner cartridge 70 can be referred to as a direction outward in the rotational radius direction of the rotary body 90, that is, a direction away from the rotational axis 90C.

As illustrated in FIGS. 7A and 7B, since the user detaches the toner cartridge 70 from the rotary body 90, it is preferable that the at least part of the toner cartridge 70 projects from the rotary body 90 at the time of detaching the toner cartridge 70. In the present embodiment, the entirety of the toner cartridge 70 projects from the rotary body 90 when the toner cartridge 70 is at the retracted position.

It can be said that when the rotary body 90 rotates about the rotational axis 90C, the rotational trajectory of the rotary body 90 matches a circumscribed circle of the rotary body 90 centered on the rotational axis 90C, that is, a virtual circle 90V indicated by a broken line in FIGS. 7A and 7B. When the toner cartridge 70 is at the retracted position, half the length or more of the toner cartridge 70 in the retracted direction is preferably outside the rotational trajectory of the rotary body 90. That is, as viewed in the rotational axis direction of the rotary, half the total length or more of the toner cartridge is preferably positioned outside the rotational trajectory of the rotary in the movement direction of the toner cartridge from the attached position to the retracted position. This applies to the toner cartridges 70 including the toner cartridge 70*k* serving as an example of the first cartridge and the toner cartridge 70*m* serving as an example of the second cartridge. In addition, in the present embodiment, the entirety of the toner cartridge 70 is outside the rotational trajectory (virtual circle 90V) of the rotary body 90 when the toner cartridge 70 is at the retracted position as illustrated in FIGS. 7A and 7B.

Further, to make it easier for the user to grab the toner cartridge 70, at least part of the toner cartridge 70 is preferably outside the image forming apparatus 1, that is, outside the apparatus body 1A when the toner cartridge 70 is at the retracted position. The outside of the apparatus mentioned herein refers to a space that is outside the image forming apparatus 1 (outside the apparatus body 1A) when the image forming apparatus 1 is used for, for example, an image forming operation on the sheet S.

In the present embodiment, the exterior surface of the apparatus body 1A is constituted by the exterior surface of the frame 16. That is, outside the apparatus can be also referred to as outside the frame 16. Therefore, a state in which at least part of the toner cartridge 70 is outside the apparatus can be also referred to as a state in which at least part of the toner cartridge 70 projects to the outside of the frame 16 through the opening 16*a* of the frame 16 of the apparatus body 1A.

In the present embodiment, when the door 14 is at the closed position, the opening 16*a* of the frame 16 of the apparatus body 1A is covered by the door 14. Further, the exterior surface 14*a* of the door 14 at the closed position constitutes part of the exterior surface of the apparatus body 1A. In this case, outside of the apparatus refers to the outside of the exterior surface 14*a* of the door 14 at the closed position. That is, in the case where the position of the exterior surface 14*a* of the door 14 at the closed position is referred to as an exterior position, at least part of the toner cartridge 70 is positioned more outward than the exterior position with respect to the apparatus body 1A when the toner cartridge 70 is at the retracted position.

In other words, at least part of the toner cartridge 70 is positioned in a space that would be outside the apparatus body 1A if the door 14 were at the closed position. Further, at least part of the toner cartridge 70 is positioned downstream of the exterior position in the retraction direction of the toner cartridge 70.

In addition, in the case where the side surface 16*b* having the opening 16*a* is the front surface of the apparatus body 1A, it can be said at least part of the toner cartridge 70 projects to the front side more than the exterior surface on the front side of the apparatus body 1A when the toner cartridge 70 is at the retracted position. In this case, the user can easily access the toner cartridge 70 from the front side of the image forming apparatus and replace the toner cartridge 70.

To be noted, when the toner cartridge 70 is at the retracted position, half the length or more of the toner cartridge 70 in the retraction direction is preferably outside the apparatus. That is, as viewed in the rotational axis direction of the rotary, half the total length or more of the toner cartridge is preferably positioned outside the body frame in the movement direction of the toner cartridge from the attached position to the retracted position in a state in which the toner cartridge is at the retracted position. This applies to the toner cartridges 70 including the toner cartridge 70*k* serving as an example of the first toner cartridge and the toner cartridge 70*m* serving as an example of the second toner cartridge. In addition, the entirety of the toner cartridge 70 is preferably outside the apparatus when the toner cartridge 70 is at the retracted position. To be noted, although the exterior surface 14*a* of the door 14 and the side surface 16*b* constitute the exterior surface on the front side of the apparatus body 1A in the present embodiment, the configuration of the door 14 is not limited to this. For example, the size of the door 14 may be set so as to cover the entirety of the side surface 16*b*. In this case, the exterior surface 14*a* of the door 14 constitutes the exterior surface on the front side of the apparatus body 1A.

The tray 80 includes a cartridge holding portion 81 illustrated in FIGS. 3 and 6C that holds the toner cartridge 70. The cartridge holding portion 81 is an attached portion to which the toner cartridge 70 is attached. When the tray 80 is at the detachment position, the entirety of the cartridge holding portion 81 is preferably outside the rotational trajectory of the rotary body 90 in the retraction direction. When the tray 80 is at the detachment position, half the length or more of the cartridge holding portion 81 is preferably outside the apparatus in the retraction direction.

Here, as described above, the toner cartridge 70*k* and the tray 80*k* are larger in size than the other toner cartridges 70*y* to 70*c* and the other trays 80*y* to 80*c*. Therefore, as illustrated in FIGS. 7A and 7B, in the present embodiment, the movement amount of the tray 80 in toner cartridge replacement is changed in accordance with the size of the toner cartridge 70.

Specifically, as illustrated in FIG. 7A, the movement distance of the tray 80*k* (first support member) from the accommodation position (first accommodation position) to the detachment position (first detachment position) is L1. The movement distance of the tray 80*m* (second support member) from the accommodation position to the detachment position (third detachment position) is L2. Although a state in which the toner cartridge 70*m* and the tray 80*m* are moved is illustrated in FIG. 7B, the movement distance of the trays 80*y* and 80*c* from the accommodation position to the detachment position is also L2. In this case, L1 is larger than L2. In other words, it can be said that the movement distance of the first support member in the case where the first toner cartridge moves from the first attached position to the first retracted position is larger than the movement distance of the second support member in the case where the second toner cartridge moves from the second attached position to the second retracted position.

In addition, as illustrated in FIG. 7A, in a state in which the tray 80*k* is at the detachment position and the toner cartridge 70*k* is at the retracted position, the toner cartridge 70*k* projects from the exterior surface of the apparatus body 1A to the outside of the apparatus by a distance P1. In the present embodiment, the tray 80*k* also projects from the exterior surface of the apparatus body 1A to the outside of the apparatus by the distance P1.

In addition, as illustrated in FIG. 7B, in a state in which the tray 80*m* is at the detachment position and the toner cartridge 70*m* is at the retracted position, the toner cartridge 70*m* projects from the exterior surface of the apparatus body 1A to the outside of the apparatus by a distance P2. In the present embodiment, the tray 80*m* also projects from the exterior surface of the apparatus body 1A to the outside of the apparatus by the distance P2. To be noted, the toner cartridges 70*y* and 70*c* also project from the exterior surface of the apparatus body 1A to the outside of the apparatus by the distance P2.

The distance P1 described above is larger than the distance P2. That is, the length by which the first toner cartridge at the first retracted position projects through the opening 16*a* of the apparatus body 1A will be referred to as a first length (P1), and the length by which the second toner cartridge at the second retracted position projects through the opening 16*a* will be referred to as a second length (P2). In this case, it can be said that the first length is larger than the second length.

It is more preferable in terms of strength that the distance P2 by which the toner cartridges 70*y* to 70*c* smaller in size than the toner cartridge 70*k* project to the outside of the apparatus at the retracted position is smaller than the distance P1 by which the toner cartridge 70*k* projects to the outside at the retracted position. The reason for this is as follows. When the toner cartridge 70 is at the retracted position, at least part of the toner cartridge 70 projects to the outside of the apparatus from the outside of the rotational trajectory of the rotary body 90 or the exterior surface of the apparatus body 1A. At this time, the tray 80 supports the weight of the toner cartridge 70 in a state in which one side thereof is supported by the rotary body 90. Therefore, reducing the distance P2 by which the toner cartridges 70*y* to 70*c* project to the outside of the apparatus at the retracted position can reduce the load on the trays 80*y* to 80*c* or guide portions 97 of the rotary body 90 supporting the trays 80*y* to 80*k*. In addition, since the toner cartridges 70*y* to 70*c* are smaller than the toner cartridge 70*k*, the operability in the cartridge replacement for the trays 80*y* to 80*c* can be maintained even if the distance P2 is set to be smaller than the distance P1.

Tray Arrangement in Rotary

Figure 9:
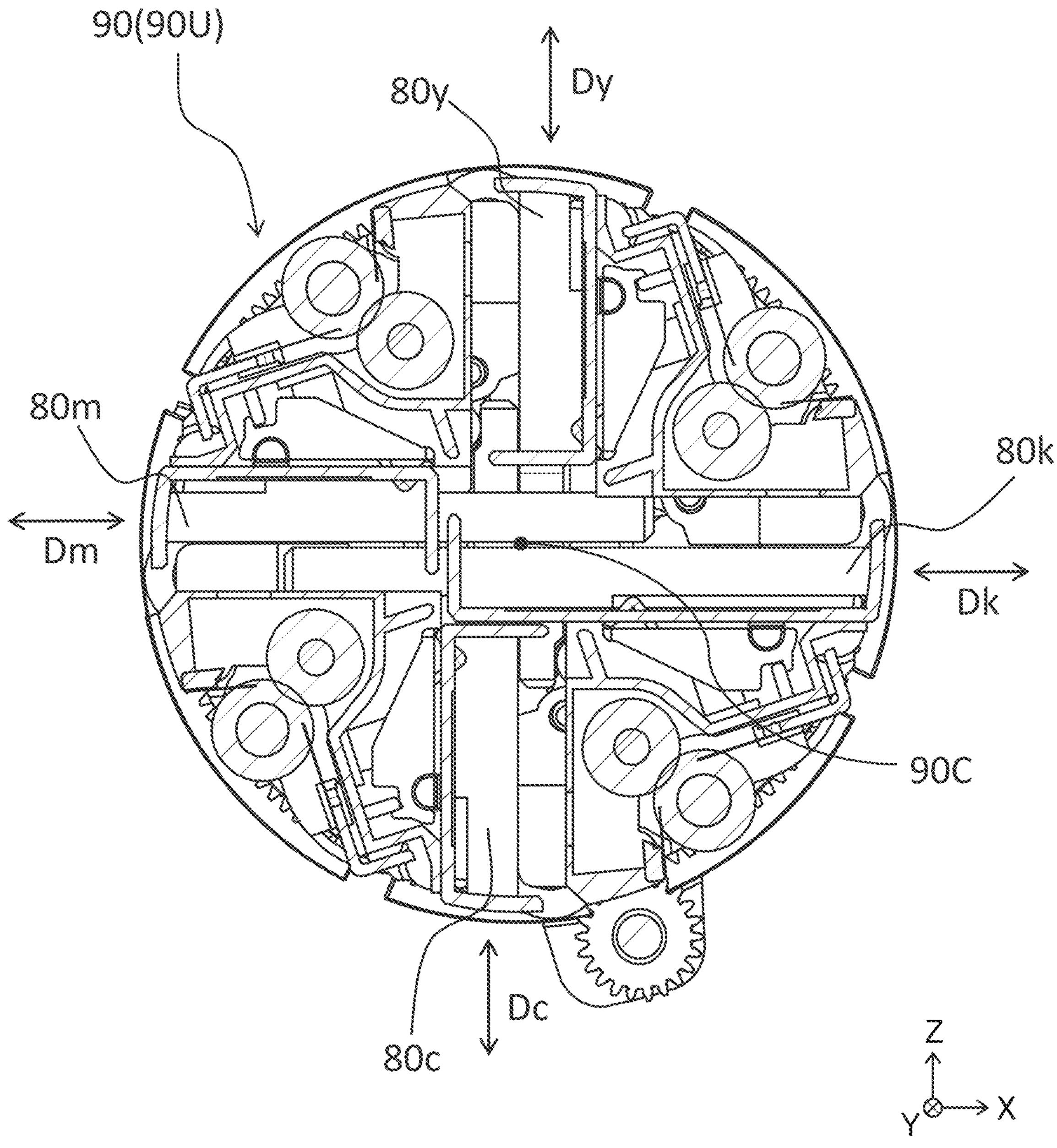
FIG. 9 is an explanatory diagram of the rotary body according to the first embodiment.

The arrangement of the trays 80*y* to 80*k* in the rotary body 90 will be described with reference to FIGS. 8 and 9. FIG. 8 is a perspective view illustrating the arrangement of the trays 80*y* to 80*k* in the rotary body 90. FIG. 9 is a section view illustrating the arrangement of the trays 80*y* to 80*k* in the rotary body 90. To be noted, FIG. 9 illustrates a cross-section of the rotary body 90 taken along a virtual plane orthogonal to the rotational axis 90C of the rotary body 90.

As illustrated in FIG. 8, the trays 80*y* to 80*k* are respectively provided with cartridge holding portions 81*y* to 81*k* and guided portions 82*y* to 82*k*.

The toner cartridges 70*y* to 70*k* are respectively attached to the cartridge holding portions 81*y* to 81*k*. The cartridge holding portions 81*y* to 81*k* respectively accommodate at least part of the toner cartridges 70*y* to 70*k* attached thereto.

The guided portions 82*y* to 82*k* are provided at respective end portions of the trays 80*y* to 80*k* such that the cartridge holding portions 81*y* to 81*k* are each interposed therebetween in the Y direction. The guided portions 82*y* to 82*k* are each a thin and long member extending in a direction orthogonal to the rotational axis of the rotary body 90.

Figure 10A:
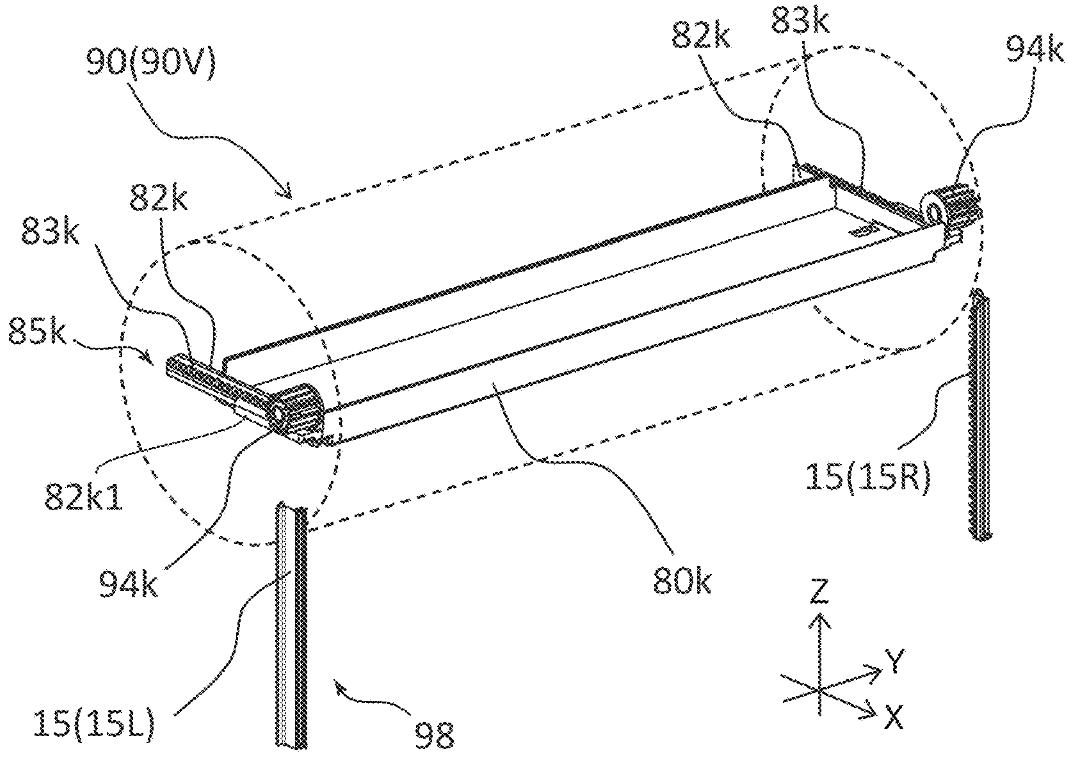
FIGS. 10A and 10B are each an explanatory diagram of elements related to movement of the tray according to the first embodiment.
Figure 10B:
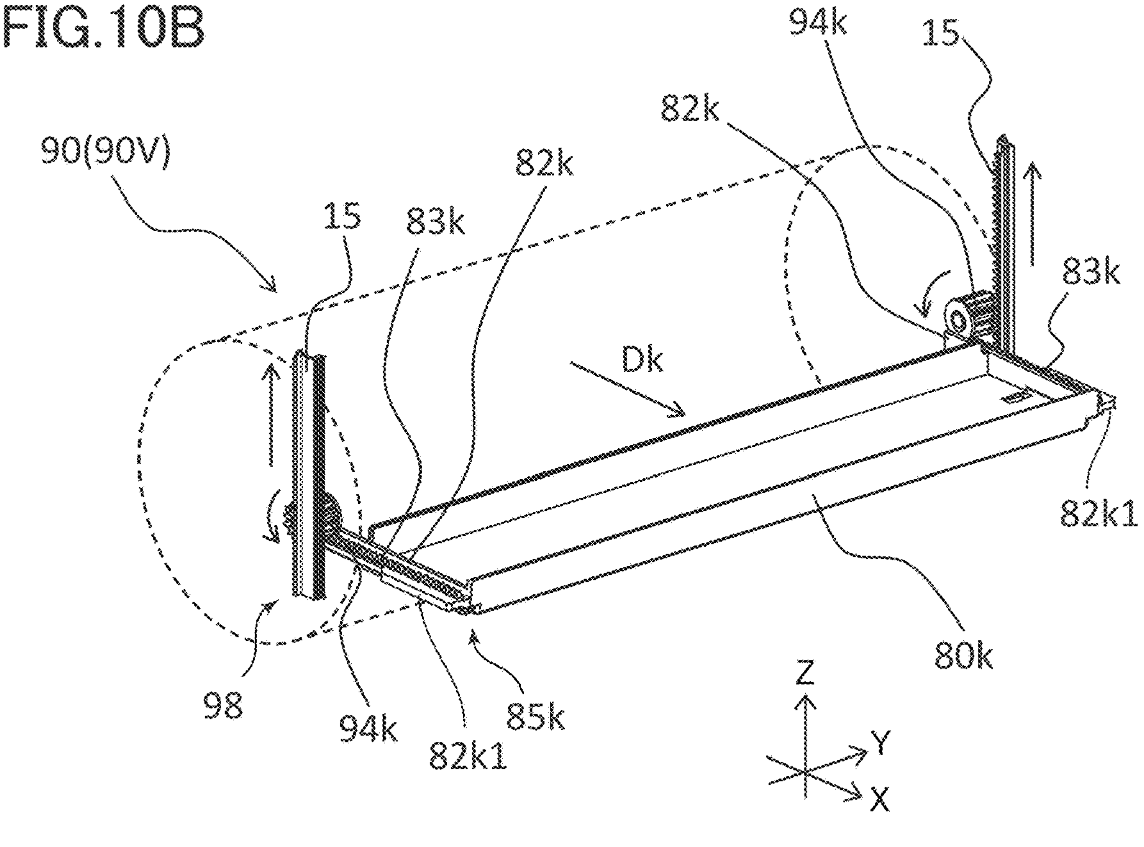

In the present embodiment, a reinforcing rib 82*k*1 is formed on part of the guided portion 82*k* in a movement direction Dk of the tray 80*k*, and a reinforcing rib 82*m*1 is formed on part of the guided portion 82*m* in a movement direction Dm of the tray 80*m* as illustrated in FIGS. 10A and 10B. The reinforcing ribs 82*k*1 and 82*m*1 are thin and long rib shapes (ridges) projecting outward in the Y direction from the guided portions 82*k* and 82*m* of the respective end portions of the trays 80*k* and 80*m* in the Y direction and extending in the movement directions Dk and Dm of the trays 80*k* and 80*m*. The reinforcing ribs 82*k*1 and 82*m*1 improve the stiffness of the guided portions 82*k* and 82*m*.

To be noted, although the lengths of the reinforcing ribs 82*m*1 and 82*k*1 in the present embodiment are restricted so as to avoid the guided portions 82*y* and 82*c*, the reinforcing ribs 82*m*1 and 82*k*1 may be provided for the entire lengths of the guided portions 82*m* and 82*k* unless interference with the guided portions 82*y* and 82*c* occurs. Reinforcing ribs may be added to the guided portions 82*y* and 82*c*. In addition, in the case where the stiffness of the guided portions 82*m* and 82*k* is sufficient, a configuration in which the reinforcing ribs 82*m*1 and 82*k*1 are not provided may be employed.

The guided portions 82*y* to 82*k* have rack portions (rack gears) 83*y* to 83*k* formed therein. In addition, pinion gears 94*y* to 94*k* are rotatably held in the rotary body 90. The pinion gears 94*y* to 94*k* are respectively engaged with the rack portions 83*y* to 83*k* in a manner capable of transmitting a driving force.

The rack portions 83*y* to 83*k* and the pinion gears 94*y* to 94*k* are part of the moving devices 85*y* to 85*k* configured to move the toner cartridges 70*y* to 70*k* from the attached position to the retracted position. In addition, it can be said that the rack portions 83*y* to 83*k* and the pinion gears 94*y* to 94*k* are part of a driven device driven by the driving device 98 of the apparatus body 1A. It can be said that the pinion gears 94*y* to 94*k* are rotatable bodies (rotary members) that rotate to move the trays 80*y* to 80*k* with respect to the rotary body 90.

The pinion gears 94*y* to 94*k* and the rack portions 83*y* to 83*k* function as driven portions for the moving devices 85*y* to 85*k* of the rotary body 90 to receive the driving force from the driving device 98 of the apparatus body 1A. The pinion gear 94*k* and the rack portion 83*k* are examples of a first pinion gear and a first rack gear constituting at least part of a first driven portion included in a first moving device. The pinion gear 94*m* and the rack portion 83*m* are examples of a second pinion gear and a second rack gear constituting at least part of a second driven portion included in a second moving device.

The rotary body 90 includes guide portions 97 illustrated in FIGS. 7A and 7B that respectively engage with the guided portions 82*y* to 82*k*. FIG. 7A illustrates the guide portion 97 (97*k*) that engages with the guided portion 82*k* of the tray 80*k*, and FIG. 7B illustrates the guide portion 97 (97*m*) that engages with the guided portion 82*m* of the tray 80*m*. The rotary body 90 includes similar guide portions that respectively engage with the guided portions 82*y* and 82*c* of the trays 80*y* and 80*c*. In addition, although the guide portions 97 provided on one side (+Y side) of the rotary body 90 in the Y direction are illustrated in FIGS. 7A and 7B, similar guide portions 97 are also provided on the other side (−Y side) of the rotary body 90 in the Y direction.

When the tray 80 moves between the accommodation position and the detachment position, the guide portion 97 maintains the state of engaging with the guided portion 82 in at least part of the movement range, and guides the movement direction of the tray 80. In the present embodiment, the guide portion 97 maintains the state of engaging with the guided portion 82*k* in the entirety of the movement range of the tray 80*k* between the accommodation position and the detachment position. In addition, in the present embodiment, the guide portion 97 maintains the state of engaging with the guided portion 82*m* in the entirety of the movement range of the tray 80*m* between the accommodation position and the detachment position.

In addition, as illustrated in FIGS. 8 and 9, the four trays 80*y* to 80*k* are disposed in the rotary body 90 so as to overlap each other as will be described in detail below.

When the pinion gears 94*y* to 94*k* rotate, the rack portions 83*y* to 83*k* and the trays 80*y* to 80*k* move with respect to the rotary body 90. As illustrated in FIG. 9, the four trays 80*y* to 80*k* are arranged such that the movement directions thereof with respect to the rotary body 90 are rotated by 90° from each other. Therefore, the tray 80*y* and the tray 80*c* are held so as to be slidable in substantially the same direction (parallel directions) as each other, and the tray 80*m* and the tray 80*k* are held so as to be slidable in substantially the same direction (parallel directions) as each other. The movement directions of sliding of the trays 80*y* to 80*k* are regulated by the engagement between the guide portions 97 and the guided portions 82*y* to 82*k* described above.

To be noted, the trays 80*y* to 80*k* move to the outside of the apparatus through the opening 16*a*. When the trays 80*y* to 80*k* each move to the outside of the apparatus through the opening 16*a*, the movement directions of the trays are substantially the same (parallel).

Moving Elements of Tray

Figure 11A:
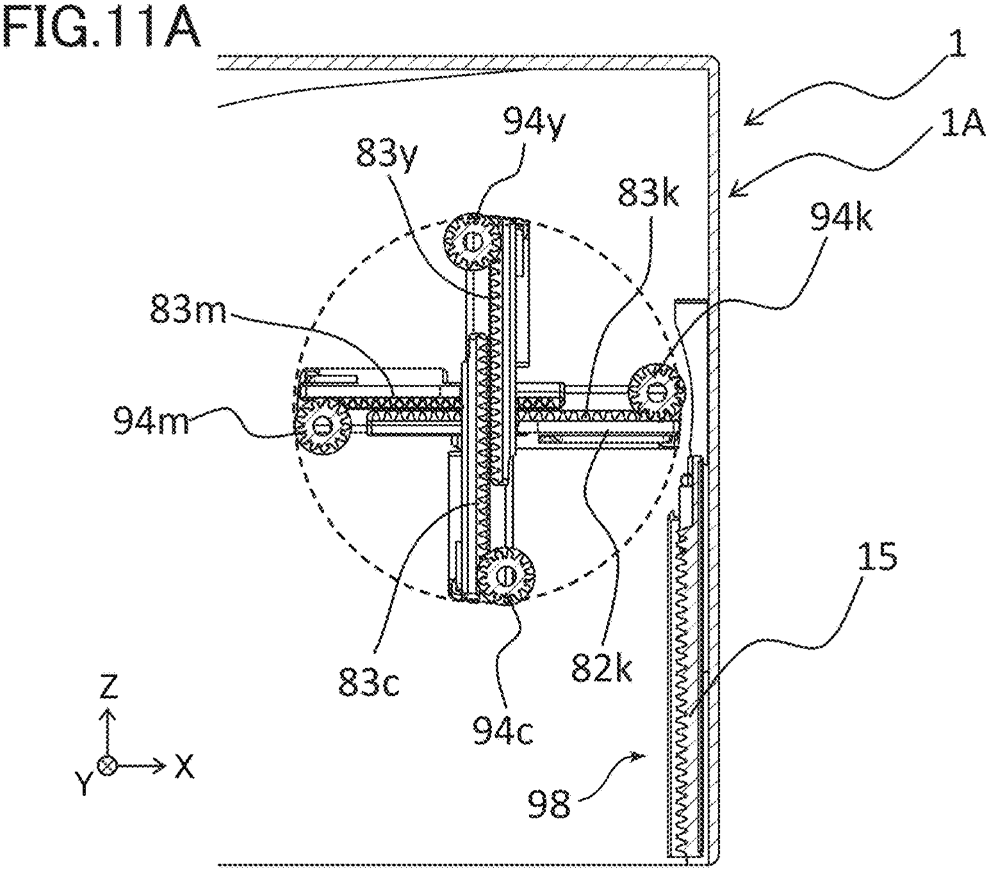
FIGS. 11A and 11B are each an explanatory diagram of elements related to movement of the tray according to the first embodiment.
Figure 11B:
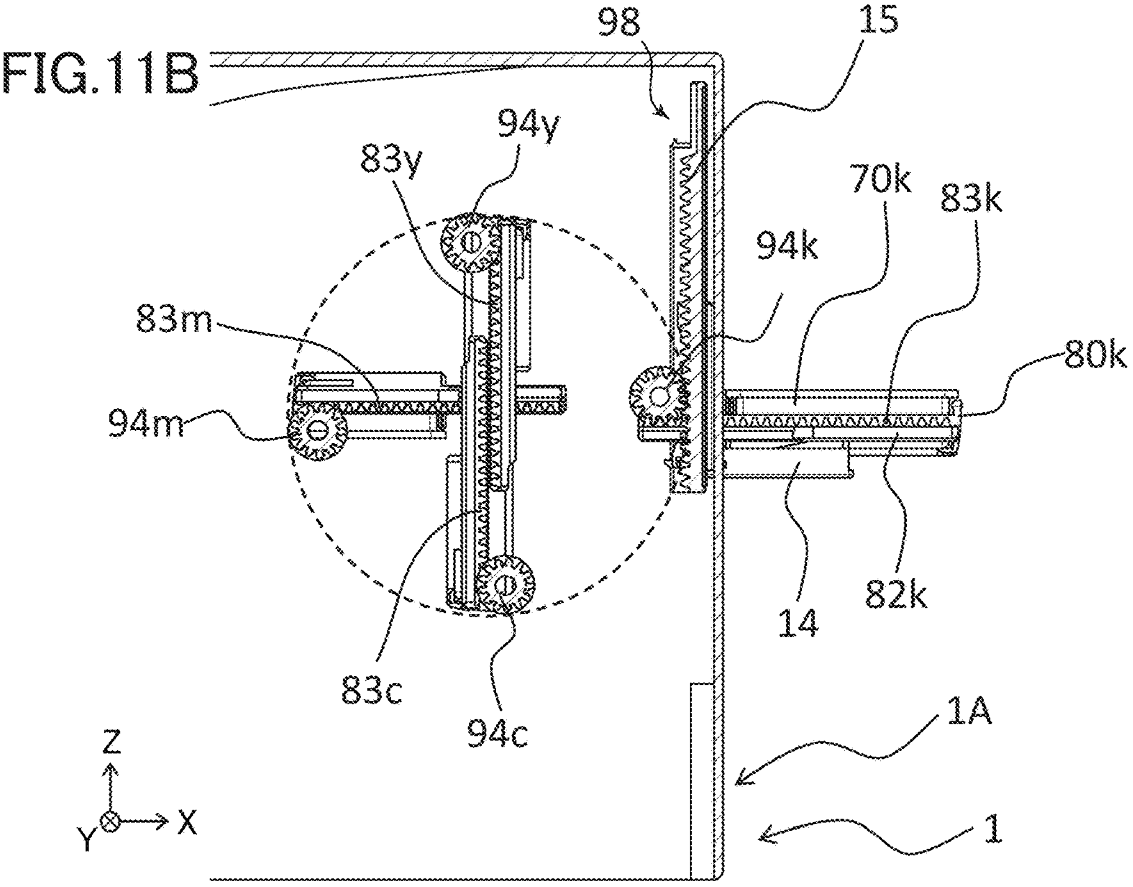

Elements related to the movement of the trays 80*y* to 80*k* disposed in the rotary body 90 will be described with reference to FIGS. 10A, 10B, 11A, and 11B. FIGS. 10A and 10B are each a perspective view of elements related to the movement of the tray 80*k*. FIGS. 11A and 11B are each a section view of elements related to the movement of the tray 80*k*.

In the present embodiment, the trays 80*y* to 80*k* are respectively driven by receiving the driving force of the motor M2 transmitted to the pinion gears 94*y* to 94*k* of the rotary body 90 via the driving racks 15L and 15R serving as driving members. Here, the elements for moving the tray 80*k* with respect to the rotary body 90 will be described, and since the elements for moving the trays 80*y* to 80*c* with respect to the rotary body 90 are substantially the same as the elements for moving the tray 80*k*, description thereof will be omitted.

FIG. 10A illustrates a state in which the tray 80*k* is inside the rotary body 90, that is, in a state in which the toner cartridge 70*k* is attached to the developing unit 50*k*. That is, FIG. 10A illustrates a state in which the tray 80*k* is at the accommodation position, and corresponds to a state in which the toner cartridge 70*k* is at the attached position with respect to the developing frame 53*k* illustrated in FIG. 4A. FIG. 10B illustrates a state in which the tray 80*k* has slid to the outside of the rotary body 90. That is, FIG. 10B illustrates a state in which the tray 80*k* is at the detachment position, and corresponds to a state in which the toner cartridge 70*k* is at the retracted position with respect to the developing frame 53*k* illustrated in FIG. 4B.

The apparatus body 1A of the present embodiment includes the driving racks 15L and 15R serving as driving gears that drive the pinion gears 94. The driving racks 15 are each driven by the motor M2 via the unillustrated drive transmission mechanism.

As described above, two rack portions 83*k* are formed at respective end portions of the tray 80*k* in the Y direction. Two pinion gears 94*k* and the driving racks 15L and 15R are disposed at positions respectively corresponding to the rack portions 83*k* at the respective end portions. That is, the apparatus body 1A of the present embodiment includes the driving racks 15L and 15R serving as the first driving gear and the second driving gear. It can be said that the driving rack 15L is an example of a first driving gear, and the driving rack 15R is an example of a second driving gear. However, this numbering is merely used for the sake of convenience of description, and can be appropriately interchanged in principle. In the case where there is no need to distinguish the driving racks 15L and 15R from each other, the driving racks will be each described as a "driving rack 15".

The rack portions 83 of the present embodiment are configured as a rack gear pair, and the pinion gears 94 of the present embodiment are configured as a pinion gear pair. The rack gear pair and the pinion gear pair are disposed on the two end sides of the support member (tray 80) in the Y direction in the present embodiment, but the rack gear pair and the pinion gear pair may be disposed at other positions. The rack portions 83*k* and the pinion gears 94*k* of the moving device 85*k* corresponding to the tray 80*k* can be respectively referred to as examples of a first rack gear pair and a first pinion gear pair. The rack portions 83*y* to 83*c* and the pinion gears 94*y* to 94*c* of the moving devices 85*y* to 85*c* respectively corresponding to the other trays 80*y* to 80*c* can be respectively referred to as examples of second rack gear pairs and second pinion gear pairs.

One of the rack gear pair engages with one of the pinion gear pair, and the other of the rack gear pair engages with the other of the pinion gear pair. At least one of the pinion gear pair is driven by the driving rack 15L serving as a first driving rack. In the present embodiment, two of the pinion gear pair are simultaneously driven by the driving racks 15L and 15R serving as a first driving rack and a second driving rack. As a result of this, rotation of the tray 80 is less likely to occur, and thus stable movement of the toner cartridge 70 is made possible.

To be noted, a configuration in which the tray 80 includes one rack portion 83 and is moved by one driving rack 15 via one pinion gear 94 may be employed.

The tray 80*k* is held to be slidable in a direction parallel to the guided portion 82*k* (that is, the movement direction Dk) with respect to the rotary body 90. The driving rack 15 is held to be slidable in a direction intersecting with the movement direction Dk of the tray 80*k* with respect to the apparatus body 1A. The driving rack 15 is configured to slide (reciprocate) in a first direction (vertically upward direction in the present embodiment) and a second direction (vertically downward direction in the present embodiment) opposite to the first direction, with respect to the apparatus body 1A. That is, the movement direction of the driving rack 15 of the present embodiment is a direction intersecting with (preferably orthogonal to) both the movement direction Dk of the tray 80*k* and the direction of the rotational axis 90C of the rotary body 90 (Y direction).

A tray moving operation of sliding the tray 80*k* between the accommodation position and the detachment position will be described with reference to FIGS. 10A and 10B. The tray moving operation of the tray 80*k* is performed by the motor M2 illustrated in FIG. 2, an unillustrated drive transmission mechanism, the driving rack 15, the pinion gear 94*k*, and the rack portion 83*k*.

First, a tray moving operation (tray pull-out operation) of detaching the toner cartridge 70*k* from the rotary body 90 will be described. In a state before the tray pull-out operation is started, the driving rack 15 illustrated in FIG. 10A is positioned below a position where the driving rack 15 engages with the pinion gear 94*k*. In addition, as described above, in the replacement operation of the toner cartridge 70*k*, the rotary body 90 takes the replacement operation illustrated in FIG. 4B for the toner cartridge 70*k*.

When the tray pull-out operation is started, the driving racks 15 are slid upward with respect to the apparatus body 1A by the driving force of the motor M2. In the course of movement of the driving racks 15, the driving racks 15 engage with the pinion gears 94*k*, and the pinion gears 94*k* are rotationally driven.

As illustrated in FIG. 10B, the pinion gears 94*k* are rotationally driven in an arrow direction in FIG. 10B, and thus the driving force is input to the rack portions 83*k* engaged with the pinion gears 94*k*. As a result of this, the tray 80*k* is pushed to the outside of the apparatus, and moves from the accommodation position to the detachment position with respect to the rotary body 90. The movement direction of the tray 80*k* at this time is guided to the predetermined movement direction Dk by the engagement between the guided portion 82*k* and the guide portion 97*k* of the rotary body 90 illustrated in FIG. 7A. As a result of the tray 80*k* moving from the accommodation position to the detachment position, the toner cartridge 70*k* is moved from the attached position to the retracted position with respect to the developing unit 50*k*.

In a state in which the tray 80*k* is positioned at the detachment position and the toner cartridge 70*k* is positioned at the retracted position, the user can attach and detach the toner cartridge 70*k* to and from the tray 80*k*.

The tray moving operation (tray pull-in operation or tray insertion operation) at the time of attaching the toner cartridge 70 to the rotary body 90 is performed in a process reversed from the tray pull-out operation. For example, the tray pull-in operation is started in response to the user operating a predetermined operation portion. When the tray pull-in operation is started, the driving racks 15 are slid downward with respect to the apparatus body 1A by the driving force of the motor M2. Here, the rotational direction of the motor M2 in the tray pull-in operation is opposite to that in the tray pull-out operation.

As a result of the pinion gears 94*k* being rotationally driven in a direction opposite to the arrow of FIG. 10B, the driving force is input to the rack portions 83*k* engaged with the pinion gears 94*k*. As a result of this, the tray 80*k* is pulled into the apparatus, and moves from the detachment position to the accommodation position with respect to the rotary body 90. The movement direction of the tray 80*k* is guided to the movement direction Dk opposite to the arrow of FIG. 10B by the engagement between the guided portion 82*k* and the guide portion 97*k* of the rotary body 90. As a result of the tray 80*k* moving from the detachment position to the accommodation position, the toner cartridge 70*k* is moved from the retracted position to the attached position with respect to the developing unit 50*k*.

Movement of the tray 80*k* and the toner cartridge 70*k* for black has been described above, and movement of the other trays 80*y* to 80*c* and toner cartridges 70*y* to 70*c* is also performed by a similar mechanism. That is, the driving racks 15 transmit drive to the pinion gears 94*y* to 94*c* in respective replacement positions of the toner cartridges.

The motor M2 provided in the apparatus body 1A and the transmission device 99 including the driving racks 15 (15L and 15R) and the drive transmission mechanism constitute the driving device 98 for driving the moving devices 85 provided in the rotary body 90. Details of the transmission device 99 will be described later with reference to FIGS. 12A to 12C.

As described above, in the present embodiment, a plurality of moving devices 85*k* to 85*y* corresponding to the plurality of toner cartridges 70*k* to 70*y* are disposed in the rotary body 90. The driving device 98 of the apparatus body 1A is a common driving device that drives the plurality of moving devices 85*k* to 85*y* (plurality of driven devices) of the rotary body 90.

In addition, in the present embodiment, the driving target of the driving device 98 switches in accordance with the rotation of the rotary body 90. In other words, the driving device of the present embodiment includes the driving racks 15 serving as driving members that transmit the driving force of the drive source. The driving device can take a state in which the driving members engage with a first driven portion (pinion gear 94*k*) such that drive is transmittable and a state in which the driving members engage with a second driven portion (pinion gear 94*m*) such that drive is transmittable. In addition, the driving device can take a state in which the driving members are disengaged from the first driven portion and the second driven portion.

As described above, the pinion gears 94*y* to 94*k* are held by the rotary body 90. Therefore, when the rotary body 90 rotates, it is preferable that the engagement between the driving racks 15 and the pinion gears 94*y* to 94*k* is released.

FIG. 11A illustrates a state in which the tray 80*k* is inside the rotary body 90, that is, a state in which the tray 80*k* is at the accommodation position. FIG. 11B illustrates a state in which the tray 80*k* has moved to the outside of the rotary body 90, that is, a state in which the tray 80*k* has moved to the detachment position.

As illustrated in FIG. 11A, when the tray 80*k* is inside the rotary body 90, the driving racks 15 are positioned in a lower portion in the apparatus body 1A. At this time, the driving racks 15 are retracted from the pinion gears 94*k*. Therefore, the rotary body 90 can be rotated without being interrupted by the driving racks 15. More specifically, the driving racks 15 can be retracted to the outside of the rotational trajectory of the rotary body 90 indicated by dotted lines in FIGS. 11A and 11B.

As described above, by rotationally driving the motor M2 in a normal direction and a reverse direction, the tray 80 attached to the rotary body 90 can be moved from the accommodation position to the detachment position and from the detachment position to the accommodation position with respect to the rotary body 90. That is, the driving device of the present embodiment can drive the moving devices such that not only the toner cartridges move from the attached position to the retracted position but also the toner cartridges move from the retracted position to the attached position.

Here, as described above, in the present embodiment, the movement amount of the tray 80 in toner cartridge replacement is changed in accordance with the size of the toner cartridge 70. Specifically, the movement distance L1 of the movement of the black tray 80*k* from the accommodation position to the detachment position is larger than the movement distance L2 of the movement of the other trays 80*y* to 80*c* from the accommodation position to the detachment position as illustrated in FIGS. 7A and 7B.

Therefore, in the present embodiment, when moving the toner cartridges 70*y* to 70*k* from the attached position to the retracted position, a value obtained by dividing the speed of the rack portions 83*k* by the speed of the driving racks 15 is larger than a value obtained by dividing the speed of the rack portions 83*y* to 83*c* by the speed of the driving racks 15.

For example, the pinion gear 94*y* is formed as a stepped gear including a large-diameter gear that engages with the driving rack 15 and a small-diameter gear that has a smaller pitch radius than the large-diameter gear and engages with the rack portion 83*y*. The pinion gears 94*m* and 94*c* are formed as similar stepped gears. In contrast, the pinion gear 94*k* is formed such that a portion thereof that engages with the driving rack 15 and a portion thereof that engages with the rack portion 83*k* have the same pitch radius. At this time, the pitch radius of the pinion gear 94*k* can be equal to the pitch radius of the large-diameter gear of the pinion gears 94*y* to 94*c*. According to this configuration, the movement distance of the rack portions 83*k* can be made larger than the movement distance of the other rack portions 83*y* to 83*c* even in the case where the movement distance of the driving racks 15 is the same. That is, the movement distance L1 of the movement of the black tray 80*k* from the accommodation position to the detachment position can be made larger than the movement distance L2 of the movement of the other trays 80*y* to 80*c* from the accommodation position to the detachment position.

In addition, by forming the pinion gears 94*y* to 94*c* as stepped gears, the movement distance L1 of the tray 80*k* can be made larger than the movement distance L2 of the other trays 80*y* to 80*c* even in the configuration in which the pinion gears 94*y* to 94*k* receive the driving force from the same driving racks 15.

To be noted, the pinion gear 94*k* may be formed as a stepped gear instead of (or in combination with) the configuration in which the pinion gears 94*y* to 94*c* are formed as stepped gears. In this case, a portion of the pinion gear 94*k* that engages with the driving rack 15 may be formed as a small-diameter gear, and a portion of the pinion gear 94*k* that engages with the rack portion 83*k* may be formed as a large-diameter gear having a larger pitch radius than the small-diameter gear. In addition, the stepped gear is an example of a speed reduction mechanism, and may be replaced by a known speed reduction mechanism that makes the movement amount of a member on the input side (drive source side) smaller than a movement amount of a member on the output side (tray 80 side).

In addition, the movement amount of the driving rack 15 when the toner cartridge 70*k* moves from the attached position to the retracted position may be made larger than the movement amount of the driving rack 15 when the toner cartridges 70*y* to 70*c* move from the attached position to the retracted position.

Incidentally, in the case where the distance of the movement of the toner cartridge 70 from the attached position to the retracted position is smaller, the movement time of the toner cartridge 70 can be made shorter, and the time in which the user waits for the toner cartridge 70 to move can be made shorter. If a configuration in which the movement amount of the driving racks 15 for the toner cartridge 70*k* is larger than the movement amount of the driving racks 15 for the toner cartridges 70*y* to 70*c* is employed as described above, the time in which the user waits for the toner cartridges 70*y* to 70*c* to move can be made shorter.

According to the configurations described above, the movement distance L1 can be made larger than the movement distance L2. These configurations may be employed in combination.

Driving Device

Figure 12A:
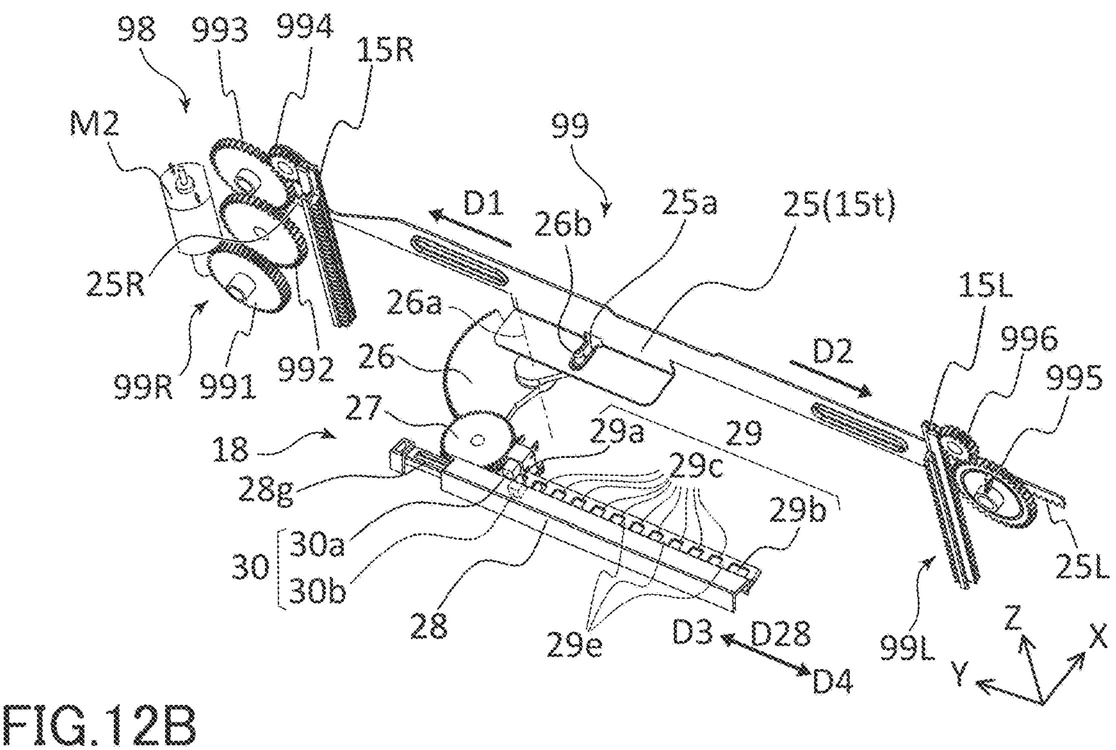
FIGS. 12A to 12C are each an explanatory diagram of a tray position detection mechanism according to the first embodiment.
Figure 12B:
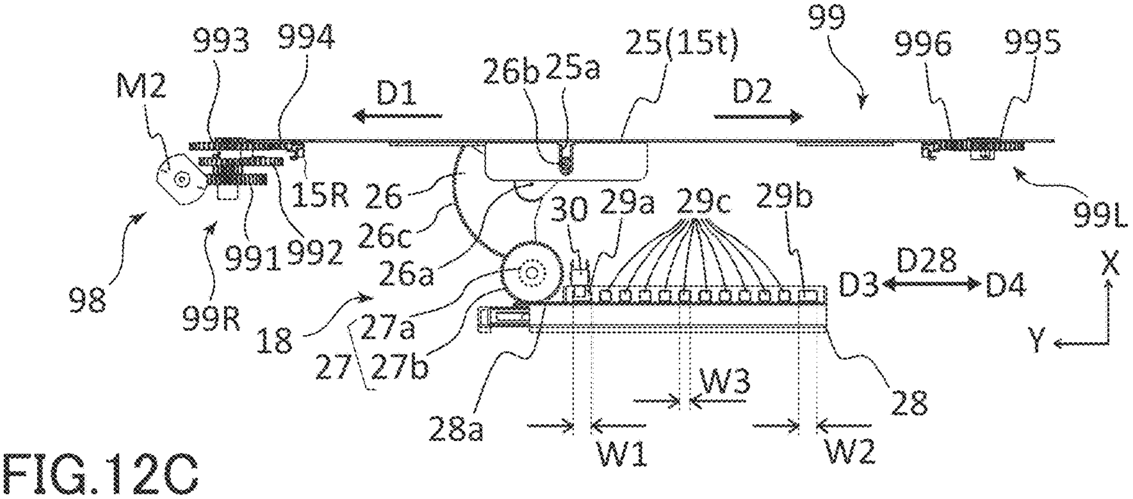

As will be described later, a tray position detection mechanism 18 of the present embodiment is configured to detect the position of a slider 25 that is part of the driving device 98. Therefore, the configuration of the driving device 98 will be described first with reference to FIGS. 12A and 12B, and then the tray position detection mechanism 18 will be described. FIG. 12A is a perspective view of the driving device 98 and the tray position detection mechanism 18. FIG. 12B is a top view (view from the +Z side) of the driving device 98 and the tray position detection mechanism 18.

In the description below, one side in the Y direction (+Y side, right side in the case where the apparatus body 1A is viewed from the front) will be referred to as the "right" side, and the other side in the Y direction (−Y side, left side in the case where the apparatus body 1A is viewed from the front) will be referred to as the "left" side. For example, the driving rack 15L is a driving rack 15 on the left side, and the driving rack 15R is a driving rack 15 on the right side.

As described above, the driving device 98 includes the motor M2 serving as a drive source and the transmission device 99 that transmits the driving force of the motor M2 to the moving device 85 (FIG. 2). In the case where part of the apparatus body 1A excluding the rotary assembly 90A (rotary body 90, tray 80, and toner cartridge 70) is referred to as a body unit of the image forming apparatus 1, the driving device 98 is provided in the body unit.

As illustrated in FIGS. 12A and 12B, the transmission device 99 includes a first gear train 99R, a second gear train 99L, driving racks 15 (15L and 15R), and the slider 25. The transmission device 99 transmits the driving force of the motor M2 to the right driving rack 15R by the first gear train 99R, and transmits the driving force of the motor M2 to the left driving rack 15L by the first gear train 99R, the slider 25, and the second gear train 99L.

The first gear train 99R is connected to each of the motor M2, the right driving rack 15R, and the slider 25, and is configured to transmit the driving force of the motor M2 to the right driving rack 15R and the slider 25. The gear train 99R of the present embodiment includes a first gear 991 that engages with an output gear of the motor M2, a second gear 992 that engages with the first gear 991, a third gear 993 that engages with the second gear 992, and a fourth gear 994 that engages with the third gear 993 and the right driving rack 15R. In addition, the third gear 993 is engaged with a first rack portion provided on the slider 25.

The second gear train 99L is coupled to the slider 25 and the left driving rack 15L, and is configured to transmit the driving force input from the slider 25 to the left driving rack 15L. The second gear train 99L in the present embodiment includes an input gear 995 that engages with a second rack portion of the slider 25, and an output gear 996 that engages with the input gear 995 and the left driving rack 15L.

The slider 25 is coupled to the first gear train 99R and the second gear train 99L. The slider 25 functions as a transmission member 15*t* that transmits the driving force of the motor M2 from the first gear train 99R disposed on the right end side of the rotary body 90 toward the second gear train 99L disposed on the left end side of the rotary body 90.

The slider 25 of the present embodiment is a thin elongated member extending in the Y direction, and is configured to be capable of reciprocating (linearly movable, slidable) along a virtual straight line extending in the Y direction. In the description below, the movement direction of the slider 25 in the tray pull-out operation will be referred to as a first movement direction D1, and the movement direction of the slider 25 in the tray pull-in operation will be referred to as a second movement direction D2. The second movement direction D2 is a direction opposite to the first movement direction D1.

The first movement direction D1 is the movement direction of the slider 25 in the case of moving the tray 80 (support member) from the accommodation position (first position) toward the detachment position (second position). The second movement direction D2 is the movement direction of the slider 25 in the case of moving the tray 80 (support member) in the pull-in direction (second direction) from the detachment position (second position) toward the accommodation position (first position).

In addition, the slider 25 of the present embodiment includes a first rack portion 25R that engages with the third gear 993 of the first gear train 99R, and a second rack portion 25L that engages with the input gear 995 of the second gear train 99L. The slider 25 receives input of the driving force of the motor M2 via the engagement between the first rack portion 25R and the third gear 993, and thus moves in the first movement direction D1 or the second movement direction D2. In addition, the slider 25 outputs the driving force to the second gear train 99L via the engagement between the second rack portion 25L and the input gear 995 in accordance with the movement in the first movement direction D1 or the second movement direction D2.

The right driving rack 15R includes an input rack portion that engages with the fourth gear 994 of the first gear train 99R, and an output rack portion configured to engage with a right pinion gear 94 (FIGS. 11A and 11B) of the rotary body 90. The left driving rack 15L includes an input rack portion that engages with the output gear 996 of the second gear train 99L, and an output rack portion configured to engage with a left pinion gear 94 (FIGS. 11A and 11B) of the rotary body 90.

The right driving rack 15R is disposed on one end side (right end side) of the rotary body 90 in the rotational axis direction of the rotary body 90, and transmits the driving force to the right pinion gear 94 serving as a driven portion. The left driving rack 15L is disposed on the other end side (left end side) of the rotary body 90 in the rotational axis direction of the rotary body 90, and transmits the driving force to the left pinion gear 94 serving as a driven portion. In the case where the right pinion gear 94 is a first driven portion and the right driving rack 15R is a first driving member, the left pinion gear 94 can be referred to as a second driven portion, and the left driving rack 15L can be referred to as a second driving member. In addition, the slider 25 can be referred to as a transmission member that reciprocates in a direction along the rotational axis direction of the rotary body 90 and transmits the driving force from the motor M2 (drive source) toward the left driving rack 15L (second driving member).

In the tray pull-out operation, the drive of the motor M2 is controlled such that the motor M2 rotates in the first rotational direction. When the motor M2 is rotated in the first rotational direction, the left and right driving racks 15L and 15R are moved upward by drive transmission via the first gear train 99R, the slider 25, and the second gear train 99L. That is, each gear of the first gear train 99R rotates in accordance with the rotation of the motor M2, and the right driving rack 15R is moved upward by the fourth gear 994 of the first gear train 99R. In addition, the slider 25 is moved in the first movement direction D1 by the third gear 993 of the first gear train 99R. As a result of the movement of the slider 25 in the first movement direction D1, each gear of the second gear train 99L rotates, and the left driving rack 15L is moved upward by the output gear 996 of the second gear train 99L. Then, the left and right driving racks 15L and 15R rotate the pinion gear 94 of the rotary body 90. As a result of this, as described above, the moving device 85 of the rotary body 90 moves the tray 80 from the accommodation position toward the detachment position.

In the tray pull-in operation, the drive of the motor M2 is controlled such that the motor M2 rotates in the second rotational direction opposite to the first rotational direction. When the motor M2 is rotated in the second rotational direction, the left and right driving racks 15L and 15R are moved downward by drive transmission via the first gear train 99R, the slider 25, and the second gear train 99L. That is, each gear of the first gear train 99R rotates in accordance with the rotation of the motor M2, and the right driving rack 15R is moved downward by the fourth gear 994 of the first gear train 99R. In addition, the slider 25 is moved in the second movement direction D2 by the third gear 993 of the first gear train 99R. As a result of the movement of the slider 25 in the second movement direction D2, each gear of the second gear train 99L rotates, and the left driving rack 15L is moved downward by the output gear 996 of the second gear train 99L. Then, the left and right driving racks 15L and 15R rotate the pinion gear 94 of the rotary body 90. As a result of this, as described above, the moving device 85 of the rotary body 90 moves the tray 80 from the detachment position toward the accommodation position.

Tray Position Detection Mechanism

The tray position detection mechanism 18 will be described. As illustrated in FIGS. 12A and 12B, the tray position detection mechanism 18 of the present embodiment includes an encoder scale 28, a photo-interrupter 30, and a coupling mechanism (26 and 27) coupling the transmission device 99 and the encoder scale 28.

The encoder scale 28 is an example of a moving member configured to move in an interlocked manner with the movement of the tray 80 (support member) by the motor M2 (drive source). The photo-interrupter 30 is an example of a sensor portion that outputs a signal corresponding to the position of the encoder scale 28 (moving member).

The photo-interrupter 30 is an optical sensor (photoelectric sensor) including a light emitting element 30*a* that emits light and a light receiving element 30*b* that converts the light emitted from the light emitting element 30*a* into an electric signal. The photo-interrupter 30 is capable of outputting a LOW signal (first signal) and a HIGH signal (second signal) of a higher voltage value than the LOW signal. The photo-interrupter 30 of the present embodiment is configured to output the LOW signal in the case where light is incident on the light receiving element 30*b* and output the HIGH signal in the case where light is not incident on the light receiving element 30*b*.

The photo-interrupter 30 is electrically connected to the controller 17 (FIG. 2) of the apparatus body 1A via a cable. The controller 17 is capable of identifying the position of the tray 80 on the basis of a signal received from the photo-interrupter 30 as will be described below.

The encoder scale 28 is coupled to the transmission device 99, and is configured to move by receiving the driving force of the motor M2 from the transmission device 99. More specifically, the encoder scale 28 of the present embodiment is coupled to the slider 25 (transmission member) via the coupling mechanism (26 and 27).

The encoder scale 28 is configured to move in a third movement direction D3 in an interlocked manner with the movement of the slider 25 in the first movement direction D1, and move in a fourth movement direction D4 in an interlocked manner with the movement of the slider 25 in the second movement direction D2. The third movement direction D3 and the fourth movement direction D4 will be collectively referred to as a movement direction D28 of the encoder scale 28. The encoder scale 28 is guided by a guide member 28*g*, and thus moves in the third movement direction D3 and the fourth movement direction D4.

The encoder scale 28 is configured to be capable of linear motion. The encoder scale 28 of the present embodiment reciprocates in a direction (D3 and D4) along the rotational axis direction (Y direction) of the rotary body 90. That is, the movement direction of the encoder scale 28 is substantially parallel to the movement direction of the slider 25. Therefore, as compared with a case where, for example, the encoder scale 28 reciprocates in an intersecting direction intersecting with the movement direction of the slider 25, the space needed for installing the encoder scale 28 and the slider 25 can be reduced. To be noted, the encoder scale 28 may be configured to reciprocate in the intersecting direction (for example, a direction along the Z direction). In this case, a cam mechanism or a bevel gear mechanism that converts the movement of the slider 25 into movement of the encoder scale 28 in the intersecting direction can be used.

The encoder scale 28 is provided with a plurality of openings 29 arranged in the movement direction D28. The openings 29 each define an optical path that allows light from the light emitting element 30*a* to travel toward the light receiving element 30*b* in the case of opposing the photo-interrupter 30. In addition, the encoder scale 28 is provided with a plurality of light shielding portions 29*e* arranged in the movement direction D28. The plurality of light shielding portions 29*e* are formed from a material not transmitting the light of the photo-interrupter 30. The plurality of light shielding portions 29*e* are each a partition portion (frame portion) partitioning two adjacent openings in the movement direction D28 from each other. That is, the plurality of openings 29 are ach a space defined between two light shielding portions 29*e* adjacent in the movement direction D28.

One opening that is positioned the farthest in the third movement direction D3 among the plurality of openings 29 will be referred to as a first opening 29*a*. One opening that is positioned the farthest in the fourth movement direction D4 among the plurality of openings 29 will be referred to as a second opening 29*b*. Each opening other than the first opening 29*a* and the second opening 29*b* among the plurality of openings 29 will be referred to as an intermediate opening 29*c*. The width W1 of the first opening 29*a* in the movement direction D28 is larger than the width W3 of each intermediate opening 29*c* in the movement direction D28. In addition, the width W2 of the second opening 29*b* in the movement direction D28 is larger than the width W3 of each intermediate opening 29*c* in the movement direction D28. The settings of the widths W1 and W2 of the first opening 29*a* and the second opening 29*b* will be described later.

To be noted, in the present embodiment, the plurality of intermediate openings 29*c* each have the same width, and the interval between adjacent intermediate openings 29*c* (width of the light shielding portion 29*e*) is constant.

In the case where any of the openings 29 of the encoder scale 28 opposes the photo-interrupter 30, the light from the light emitting element 30*a* is incident on the light receiving element 30*b*, and the output of the photo-interrupter 30 is the LOW signal (first signal). In addition, in the case where the optical path from the light emitting element 30*a* toward the light receiving element 30*b* is blocked by any of the light shielding portion 29*e* of the encoder scale 28, the output of the photo-interrupter 30 is the HIGH signal (second signal).

The coupling mechanism (26 and 27) includes at least one gear, and is configured to transmit the driving force of the motor M2 from the slider 25 to the encoder scale 28. The coupling mechanism (26 and 27) includes a sector gear 26 engaged with the slider 25 and an idler gear 27 engaged with the sector gear 26 and the encoder scale 28. The coupling mechanism is configured such that the movement amount of the encoder scale 28 (moving member) is larger than the movement amount of the slider 25 (transmission member). As a result of this, the position detection of the tray 80 is more likely to be realized with high precision than in the case where the movement amount of the encoder scale 28 is equal to or less than that of the slider 25. That is, if it is attempted to detect the position of the tray with high precision in the case where the movement amount of the encoder scale 28 is small, it is required to use a photo-interrupter 30 (sensor portion) of high position detection precision or increase the dimensional precision of the encoder scale 28. In contrast, in the present embodiment, the position detection of the tray 80 can be realized with high precision by a simple configuration.

The sector gear 26 of the present embodiment includes a pin 26*b* (engaged portion) engaged with a groove portion 25*a* (engaging portion) of the slider 25, and a gear portion 26*c* that engages with the idler gear 27, and rotates about a rotational axis 26*a*. The pitch circle radius of the gear portion 26*c* is larger than the distance from the rotational axis 26*a* to the pin 26*b*. Therefore, the sector gear 26 can transmit the drive such that the movement amount of teeth of the gear portion 26*c* that is a part that outputs the driving force toward the encoder scale 28 is large as compared with the movement amount of the pin 26*b* that is a part that receives input of the driving force.

The idler gear 27 of the present embodiment includes a small-diameter gear portion 27*a* that engages with the gear portion 26*c* of the sector gear 26, and a large-diameter gear portion 27*b* that engages with the rack portion 28*a* of the encoder scale 28. The idler gear 27 is a stepped gear in which the pitch circle radius of the large-diameter gear portion 27*b* is larger than the pitch circle radius of the small-diameter gear portion 27*a*. Therefore, the idler gear 27 can transmit the drive such that the movement amount of teeth of the large-diameter gear portion 27*b* that is a part that outputs the driving force toward the encoder scale 28 is large as compared with the movement amount of teeth of the small-diameter gear portion 27*a* that is a part that receives input of the driving force.

To be noted, the mechanism constituted by the sector gear 26 and the idler gear 27 is merely an example of a coupling mechanism configured such that the movement amount of the encoder scale 28 (moving member) is larger than the movement amount of the slider 25 (transmission member). For example, a coupling mechanism in which the gear portion 26*c* of the sector gear 26 is engaged with the rack portion 28*a* of the encoder scale 28 may be used. In addition, the slider 25 may be provided with a rack portion, and a coupling mechanism in which the small-diameter gear portion 27*a* of the idler gear 27 is engaged with the rack portion of the slider 25 may be used.

Operation of Tray Position Detection Mechanism and Determination by Controller

Figure 12C:
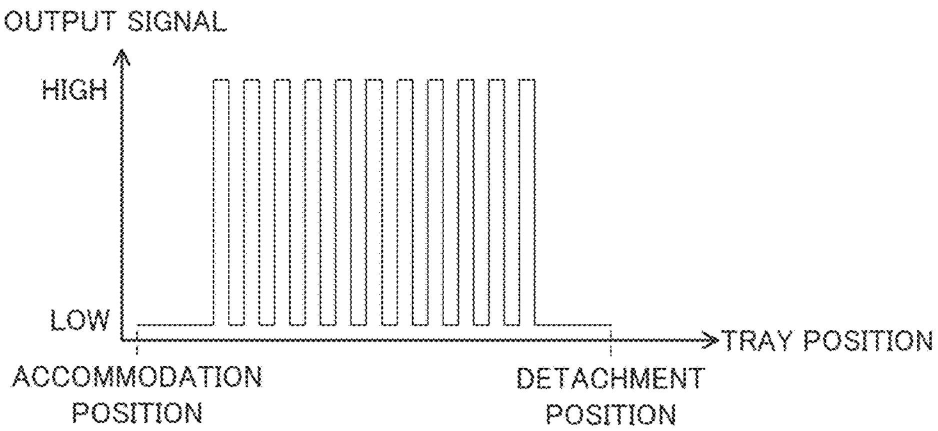

The operation of the tray position detection mechanism 18 of the present embodiment and a method for the controller 17 to identify the position of the tray by using the signal from the photo-interrupter 30 will be described. FIG. 12C is a diagram illustrating an output example of the photo-interrupter 30 of the tray position detection mechanism 18.

In a state in which the tray 80 is positioned at the accommodation position, the first opening 29*a* of the encoder scale 28 opposes the light emitting element 30*a* and the light receiving element 30*b* of the photo-interrupter 30 as illustrated in FIGS. 12A and 12B. In this case, the photo-interrupter 30 continuously outputs the LOW signal.

When the tray pull-out operation of moving the tray 80 from the accommodation position to the detachment position is started, the slider 25 is moved in the first movement direction D1 by the driving force of the motor M2, and the tray 80 is moved in the pull-out direction (first direction). The encoder scale 28 starts moving in the third movement direction D3 in an interlocked manner with the movement of the slider 25 in the first movement direction D1. Then, the optical path of the photo-interrupter 30 is blocked by the light shielding portion 29*e* adjacent to the first opening 29*a* of the encoder scale 28, and the output of the photo-interrupter 30 is switched from LOW to HIGH. After this, the intermediate opening 29*c* and the light shielding portion 29*e* of the encoder scale 28 alternately pass the photo-interrupter 30, and thus the optical path of the photo-interrupter 30 is blocked intermittently. Therefore, the photo-interrupter 30 alternately outputs the LOW signal (first signal) and the HIGH signal (second signal).

When the tray 80 reaches the detachment position, the second opening 29*b* of the encoder scale 28 opposes the light emitting element 30*a* and the light receiving element 30*b* of the photo-interrupter 30. The controller 17 stops the motor M2 in the case of determining that the tray 80 has reached the detachment position (tray pull-out operation is completed). In this case, the photo-interrupter 30 continuously outputs the LOW signal.

In addition, when the tray pull-in operation of moving the tray 80 from the detachment position to the accommodation position is started, the slider 25 is moved in the second movement direction D2 by the driving force of the motor M2, and the tray 80 is moved in the pull-in direction (second direction). The encoder scale 28 starts moving in the fourth movement direction D4 in an interlocked manner with the movement of the slider 25 in the second movement direction D2. Then, the optical path of the photo-interrupter 30 is blocked by the light shielding portion 29*e* adjacent to the second opening 29*b* of the encoder scale 28, and the output of the photo-interrupter 30 is switched from LOW to HIGH. After this, the intermediate opening 29*c* and the light shielding portion 29*e* of the encoder scale 28 alternately pass the photo-interrupter 30, and thus the optical path of the photo-interrupter 30 is blocked intermittently. Therefore, the photo-interrupter 30 alternately outputs the LOW signal (first signal) and the HIGH signal (second signal).

When the tray 80 reaches the accommodation position, the first opening 29*a* of the encoder scale 28 opposes the light emitting element 30*a* and the light receiving element 30*b* of the photo-interrupter 30. The controller 17 stops the motor M2 in the case of determining that the tray 80 has reached the accommodation position (tray pull-in operation is completed). In this case, the photo-interrupter 30 continuously outputs the LOW signal.

As described above, in the case where the tray 80 (support member) is at the accommodation position (first position), the photo-interrupter 30 (sensor portion) takes a state (first detection state) of continuously outputting the LOW signal (first signal). In addition, in the case where the tray 80 (support member) is at the detachment position (second position), the photo-interrupter 30 (sensor portion) takes a state (first detection state) of continuously outputting the LOW signal (first signal).

In addition, while the tray 80 (support member) is being moved from one toward the other of the accommodation position (first position) and the detachment position (second position), the photo-interrupter 30 (sensor portion) takes a second detection state different from the first detection state. The second detection state in the present embodiment is a state in which the photo-interrupter 30 alternately outputs the LOW signal (first signal) and the HIGH signal (second signal).

Incidentally, employing a configuration in which the support member that supports the toner cartridge is attached to the rotary and movable between the first position and the second position can be considered. In this case, the cost increases if a sensor for detecting the support member being at the first position and a sensor for detecting the support member being at the second position are provided separately.

Here, the controller 17 of the present embodiment detects that the tray 80 is in the accommodation position and that the tray 80 is in the detachment position on the basis of the combination of the information of the movement direction of the tray 80 by the motor M2 and the signal from the photo-interrupter 30. The information of the movement direction of the tray 80 by the motor M2 is information indicating which of the normal rotation direction and the reverse rotation direction the rotational direction of the motor M2 is set to.

That is, the controller 17 determines that the tray 80 has been moved to the detachment position in the case where the movement direction of the tray 80 by the motor M2 is the pull-out direction (first direction) and the photo-interrupter 30 is in the first detection state (LOW). In addition, the controller 17 determines that the tray 80 has been moved to the accommodation position in the case where the movement direction of the tray 80 by the motor M2 is the pull-in direction (second direction) and the photo-interrupter 30 is in the first detection state (LOW).

As a result of this, the configuration of the tray position detection mechanism 18 can be made simpler than a configuration in which a sensor for detecting that the tray 80 has been moved to the detachment position and a sensor for detecting that the tray 80 has been moved to the accommodation position are provided separately. In addition, the tray position detection mechanism 18 having a simpler configuration can detect that the tray 80 has been moved to the detachment position and that the tray 80 has been moved to the accommodation position.

That is, according to the present embodiment, an image forming apparatus capable of detecting that a support member is in a first position and that the support member is in a second position can be provided in a simple configuration.

More specifically, the controller 17 of the present embodiment determines that the tray 80 has been moved to the detachment position in the case where, after the start of movement of the tray 80 in the pull-out direction by the motor M2, the signal of the photo-interrupter 30 has been switched from HIGH (second signal) to LOW (first signal) and the LOW signal has been continued for a predetermined time T0 or longer. The predetermined time T0 is preset as a threshold time for detecting the completion of movement of the tray 80, and is stored in, for example, the ROM of the controller 17.

In the case where the movement speed of the encoder scale 28 in the tray pull-out operation is V0, the predetermined time T0 is larger than a value obtained by dividing the width W3 of the intermediate opening 29*c* by the speed V0 and is smaller than a value obtained by dividing the width W2 of the second opening 29*b* by the speed V0. In other words, the width W2 of the second opening 29*b* is set to be larger than the distance (T0×V0) by which the encoder scale 28 moves in the predetermined time T0 that is a threshold time for detecting the completion of movement of the tray 80. In addition, the width W3 of the intermediate opening 29*c* is set to be smaller than the distance (T0×V0) by which the encoder scale 28 moves in the predetermined time T0.

According to the configuration described above, in the case where the signal of the photo-interrupter 30 is switched to HIGH before the elapse of the predetermined time T0 after the signal is switched from HIGH to LOW, it can be seen that one of the intermediate openings 29*c* has passed the photo-interrupter 30. In contrast, a case where the signal of the photo-interrupter 30 does not switch to HIGH even after the elapse of the predetermined time T0 since the signal has switched from HIGH to LOW as illustrated in FIG. 12C will be considered. In this case, it can be seen that the second opening 29*b* is opposed to the photo-interrupter 30, that is, that the tray 80 has reached the detachment position. Therefore, the controller 17 can appropriately determine whether or not to finish the tray pull-out operation.

Similarly, the controller 17 of the present embodiment determines that the tray 80 has been moved to the accommodation position in the case where, after the start of movement of the tray 80 in the pull-in direction by the motor M2, the signal of the photo-interrupter 30 has been switched from HIGH (second signal) to LOW (first signal) and the LOW signal has been continued for the predetermined time T0 or longer.

In the case where the movement speed of the encoder scale 28 in the tray pull-in operation is V0, the predetermined time T0 is larger than a value obtained by dividing the width W3 of the intermediate opening 29*c* by the speed V0 and is smaller than a value obtained by dividing the width W1 of the first opening 29*a* by the speed V0. In other words, the width W1 of the first opening 29*a* is set to be larger than the distance (T0×V0) by which the encoder scale 28 moves in the predetermined time T0.

According to the configuration described above, in the case where the signal of the photo-interrupter 30 is switched to HIGH before the elapse of the predetermined time T0 after the signal is switched from HIGH to LOW, it can be seen that one of the intermediate openings 29*c* has passed the photo-interrupter 30. In contrast, a case where the signal of the photo-interrupter 30 does not switch to HIGH even after the elapse of the predetermined time T0 since the signal has switched from HIGH to LOW will be considered. In this case, it can be seen that the first opening 29*a* is opposed to the photo-interrupter 30, that is, that the tray 80 has reached the accommodation position. Therefore, the controller 17 can appropriately determine whether or not to finish the tray pull-out operation.

To be noted, in the case where the signal of the photo-interrupter 30 does not change from HIGH for a certain time after the start of movement of the tray 80 by the motor M2, the controller 17 can determine that the tray 80 has stopped during the movement.

In addition, according to the present embodiment, completion of movement from one toward the other of the accommodation position and the detachment position can be detected for each of a plurality of trays 80 in accordance with the posture of the rotary body 90. When the rotary body 90 is in the yellow replacement posture, the controller 17 can detect that the tray 80*y* has moved to the detachment position and that the tray 80*y* has moved to the accommodation position on the basis of the rotational direction of the motor M2 and the signal from the photo-interrupter 30. In addition, when the rotary body 90 is in the black replacement posture, the controller 17 can detect that the tray 80*k* has moved to the detachment position and that the tray 80*k* has moved to the accommodation position on the basis of the rotational direction of the motor M2 and the signal from the photo-interrupter 30. For example, in the case where the yellow toner cartridge 70*y* and the tray 80*y* are respectively a first toner cartridge and a first support member, the black toner cartridge 70*k* and the tray 80*k* are respectively examples of a second toner cartridge and a second support member.

The tray 80*k* serving as a second support member is movable between the accommodation position (third position) and the detachment position (fourth position). In the case where the tray 80*k* is at the accommodation position, and the case where the tray 80*k* is at the detachment position, the photo-interrupter 30 is in the first detection state of continuously outputting the LOW signal. While the tray 80*k* is being moved from one toward the other of the accommodation position and the detachment position, the photo-interrupter 30 is in the second detection state of alternately outputting the LOW signal and the HIGH signal. Further, the controller 17 determines that the tray 80*k* has been moved to the detachment position in the case where the movement direction of the tray 80*k* by the motor M2 is the pull-out direction and the photo-interrupter 30 is in the first detection state. In addition, the controller 17 determines that the tray 80*k* has been moved to the accommodation position in the case where the movement direction of the tray 80*k* by the motor M2 is the pull-in direction and the photo-interrupter 30 is in the first detection state.

As described above, according to the present embodiment, the positions of the plurality of trays 80 (plurality of support members) can be detected on the basis of a detection result of one photo-interrupter 30 (sensor portion). In addition, according to the present embodiment, the positions of the plurality of trays 80 (plurality of support members) can be detected by one tray position detection mechanism 18.

Further, in the present embodiment, the black toner cartridge 70*k* has a larger capacity than the toner cartridges 70*y* to 70*c* of the other colors as described above. In addition, the movement distance L1 (FIG. 7A) of the tray 80*k* corresponding to the toner cartridge 70*k* is larger than the movement distance L2 (FIG. 7B) of the other trays 80*y* to 80*c*. In contrast, the ratio of the movement amount of the tray 80 to the movement amount of the driving racks 15L and 15R can be adjusted by a method such as using a stepped gear for the pinion gear 94 as described above. Therefore, the movement amount of the slider 25 in the case of moving the toner cartridge 70*k* from the accommodation position to the detachment position is equal to the movement amount of the slider 25 in the case of moving any one of the toner cartridges 70*y* to 70*c* from the accommodation position to the detachment position.

In other words, the capacity of the toner cartridge 70*k* (second toner cartridge) is larger than the capacity of the toner cartridge 70*y*. The movement distance L1 of the toner cartridge 70*k* (second toner cartridge) from the accommodation position (third position) to the detachment position (fourth position) is larger than the movement distance L2 of the toner cartridge 70*y* from the accommodation position (first position) to the detachment position (second position). In contrast, the movement distance of the encoder scale 28 (moving member) while the toner cartridge 70*k* (second toner cartridge) moves from the accommodation position (third position) to the detachment position (fourth position) is equal to the movement distance of the encoder scale 28 (moving member) while the toner cartridge 70*y* moves from the accommodation position (first position) to the detachment position (second position).

According to this configuration, the operation of the tray position detection mechanism 18 during the movement of each tray is the same even though the movement distances L1 and L2 are different between the plurality of trays 80 (plurality of support members). Therefore, the fact that the tray 80 has moved to the detachment position and the fact that the tray 80 has moved to the accommodation position can be detected for each of the plurality of trays 80 having different movement distances L1 and L2 while the configuration of the tray position detection mechanism 18 is simple.

Modification Example

In the first embodiment, an example in which the controller 17 determines that the tray 80 has moved to the accommodation position or the detachment position on the basis of a situation in which the signal from the photo-interrupter 30 has changed from HIGH to LOW and the LOW signal has been continued for a predetermined time or longer has been described. The configuration is not limited to this, and the controller 17 may count the number of times the signal from the photo-interrupter 30 has changed from HIGH to LOW and determine that the tray 80 has moved to the accommodation position or the detachment position on the basis of the count value reaching a preset number (predetermined number of times).

In addition, the controller 17 may identify the position of the tray 80 between the accommodation position and the detachment position on the basis of the count value of the number of times the signal from the photo-interrupter 30 has changed from HIGH to LOW. That is, in the case where the movement of the tray 80 is stopped for some reason, a state in which the signal from the photo-interrupter 30 is HIGH or LOW is maintained. The controller 17 can determine that the movement of the tray 80 is stopped in the case where a state in which the signal from the photo-interrupter 30 is HIGH or LOW is maintained for a predetermined time. Then, the controller 17 can compare the count value at the time when the movement of the tray 80 is stopped with the predetermined number, and determine that the tray pull-out operation or the tray pull-in operation is stopped halfway in the case where the count value is smaller than the predetermined number.

In the case where it is determined that the tray pull-out operation or the tray pull-in operation is stopped halfway, the controller 17 may perform an operation of returning the tray 80 to the original position by rotating the motor M2 in a reverse direction. In addition, the controller 17 may notify the user of the fact that the tray pull-out operation or the tray pull-in operation has been stopped halfway by a method such as display on a screen of an operation panel included in the image forming apparatus 1. That is, in the case where the tray 80 moves from one toward the other of the accommodation position and the detachment position, the controller 17 can perform a stopping operation in the case where the state in which the signal from the photo-interrupter 30 is HIGH or LOW is maintained for a certain time and the number of times the signal has changed from HIGH to LOW is less than the predetermined number. In the stopping operation, the controller 17 can control the motor M2 such that the tray 80 moves from the other to the one of the accommodation position and the detachment position. In addition, in the stopping operation, the controller 17 can output a signal for a display portion such as the operation panel to display information about the stop of the tray pull-out operation or the tray pull-in operation. The controller 17 may include only one or both of these operations.

In addition, in the present embodiment, an example in which the photo-interrupter 30 serving as a sensor portion is configured to output a signal corresponding to the position of the encoder scale 28 (moving member) coupled to the transmission device 99 has been described. The configuration is not limited to this. The slider 25 may be provided with a plurality of openings 29, and the photo-interrupter 30 may be configured to output a signal corresponding to the position of the slider 25 serving as a moving member.

In addition, in the present embodiment, a configuration in which the LOW signal is output while the opening 29 is passing the photo-interrupter 30 and the HIGH signal is output while the light shielding portion 29*e* is passing the photo-interrupter 30 has been described. The configuration is not limited to this, and a configuration in which the HIGH signal is output while the opening 29 is passing the photo-interrupter 30 and the LOW signal is output while the light shielding portion 29*e* is passing the photo-interrupter 30 may be employed.

In addition, the configuration of the transmission device 99 described in the present embodiment is merely an example. The transmission device 99 may be configured in any manner as long as the transmission device 99 is configured to transmit the driving force of the drive source such as the motor M2 to the moving device and thus cause the moving device to move the tray 80 (support member). For example, a transmission member in which rack portions that respectively engage with the driving racks 15L and 15R are provided at respective ends of a shaft member that rotates about an axis extending in the Y direction may be used instead of the slider 25.

Second Embodiment

Figure 13:
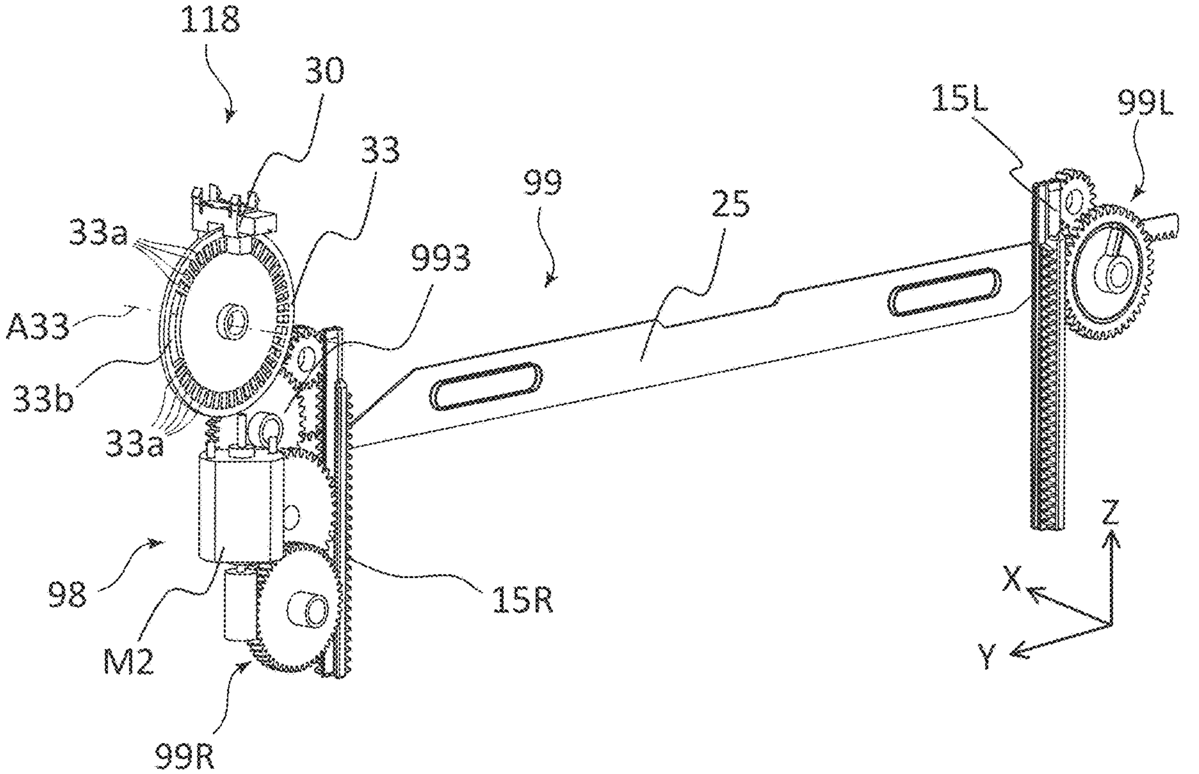
FIG. 13 is an explanatory diagram of a tray position detection mechanism according to a second embodiment.

As a second embodiment, a different configuration of a tray position detection mechanism 118 will be described with reference to FIG. 13. FIG. 13 is a perspective view of the driving device 98 and the tray position detection mechanism 118. In the description below, it is assumed that elements denoted by the same reference signs as in the first embodiment basically have the same configurations and functions as those described in the first embodiment unless described otherwise, and part different from the first embodiment will be mainly described.

The tray position detection mechanism 118 of the present embodiment includes an encoder disk 33 and the photo-interrupter 30. The encoder disk 33 includes a gear portion that engages with the third gear 993 of the first gear train 99R, and is rotationally driven in accordance with the rotation of the third gear 993. That is, in the present embodiment, the transmission device 99 includes the third gear 993 serving as a gear that transmits the driving force of the motor M2, and the encoder disk 33 serving as a moving member is coupled to the gear.

In the case where the tray 80 is moved from the accommodation position to the detachment position, the encoder disk 33 is rotated in a first rotational direction about a rotational axis A33. In the case where the tray 80 is moved from the detachment position to the accommodation position, the encoder disk 33 is rotated in a second rotational direction opposite to the first rotational direction about the rotational axis A33.

In the encoder disk 33, a plurality of openings 33*a* and 33*b* arranged along an arc centered on the rotational axis A33 are provided. The width of at least one opening 33*b* is larger than the width of the other openings 33*a*. The wide opening 33*b* opposes the light emitting element and the light receiving element of the photo-interrupter 30 in the case where the tray 80 is at the accommodation position and the case where the tray 80 is at the detachment position. In this case, the photo-interrupter 30 takes the state (first detection state) of continuously outputting the LOW signal serving as a first signal similarly to the first embodiment.

While the tray 80 is being moved from one toward the other of the accommodation position and the detachment position, the plurality of openings 33*a* sequentially pass the photo-interrupter 30, and the optical path of the photo-interrupter 30 is intermittently blocked. Therefore, while the tray 80 is being moved from one toward the other of the accommodation position and the detachment position, the photo-interrupter 30 takes the state (second detection state) of alternately outputting the LOW signal and the HIGH signal.

To be noted, the rotation amount of the encoder disk 33 while the tray 80 moves from the accommodation position to the detachment position and the rotation amount of the encoder disk 33 while the tray 80 moves from the detachment position to the accommodation position are each preferably equal to or smaller than one rotation (360°). In the case where the rotation amount of the encoder disk 33 is equal to or less than one rotation, the wide opening 33*b* can be configured not to pass the photo-interrupter 30 multiple times in one tray pull-out operation or one tray pull-in operation. Therefore, the fact that the tray 80 has been moved to the detachment position and the fact that the tray 80 has been moved to the accommodation position can be detected without counting the number of times the wide opening 33*b* has passed the photo-interrupter 30.

Also in the present embodiment, the controller 17 can detect that the tray 80 is in the accommodation position and that the tray 80 is in the detachment position on the basis of the combination of the information of the movement direction of the tray 80 by the motor M2 and the signal from the photo-interrupter 30.

That is, the controller 17 determines that the tray 80 has been moved to the detachment position (second position) in the case where the movement direction of the tray 80 by the motor M2 is the pull-out direction (first direction) and the photo-interrupter 30 is in the first detection state (LOW). In addition, the controller 17 determines that the tray 80 has been moved to the accommodation position (first position) in the case where the movement direction of the tray 80 by the motor M2 is the pull-in direction (second direction) and the photo-interrupter 30 is in the first detection state (LOW).

As a result of this, an image forming apparatus capable of detecting that the support member is in the first position and that the support member is in the second position can be provided in a simple configuration.

Third Embodiment

As a third embodiment, a configuration in which the cycle of the alternate output of the HIGH signal and the LOW signal from the photo-interrupter 30 at the start of movement of the tray 80 differs depending on the movement direction of the tray 80 will be described. In the description below, it is assumed that elements denoted by the same reference signs as in the first embodiment basically have the same configurations and functions as those described in the first embodiment unless described otherwise, and part different from the first embodiment will be mainly described.

Figure 14:
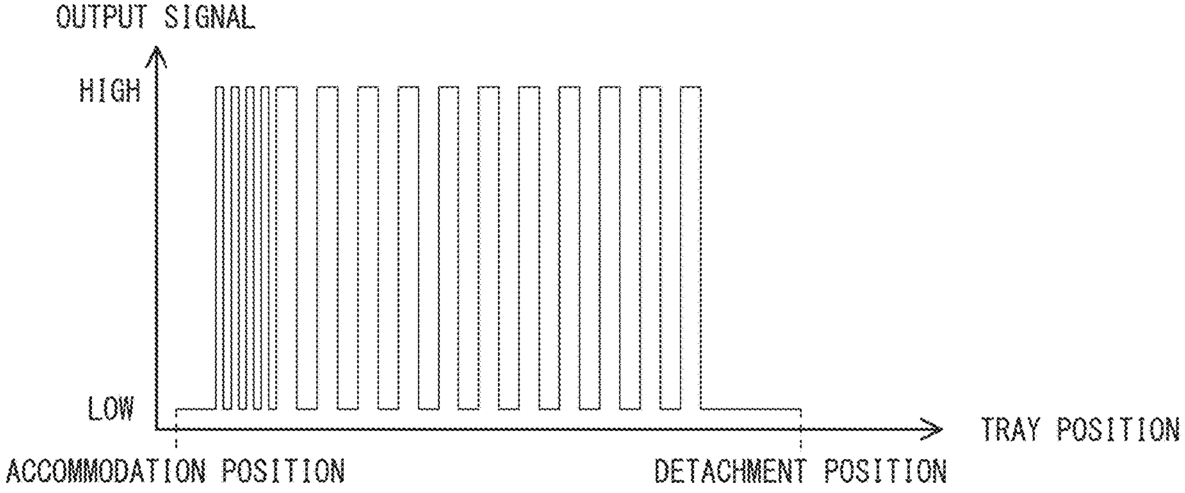
FIG. 14 is an explanatory diagram of a tray position detection mechanism according to a third embodiment.

FIG. 14 is a diagram illustrating an output example of the photo-interrupter 30 in the present embodiment. In the present embodiment, the width and pitch of the intermediate openings 29*c* (FIGS. 12A and 12B) provided in the encoder scale 28 (moving member) are not constant. The width and pitch of several intermediate openings 29*c* adjacent to the first opening 29*a* are set to be smaller than the width and pitch of the other intermediate openings 29*c*.

According to the configuration described above, the cycle of alternate output of the HIGH signal and the LOW signal at the start of movement of the tray 80 by the motor M2 from the accommodation position toward the detachment position is shorter than the cycle of alternate output of the HIGH signal and the LOW signal at the start of movement of the tray 80 by the motor M2 from the detachment position toward the accommodation position. The controller 17 can determine whether or not the tray 80 is in the vicinity of the accommodation position (i.e., whether the tray is closer to the accommodation position than to the detachment position) on the basis of the cycle of the alternate output of the HIGH signal and the LOW signal at the start of the movement of the tray 80 by the motor M2.

For example, the controller 17 drives the tray 80 in the pull-out direction (first direction) by the motor M2 to identify the position of the tray 80 in the case where the position of the tray 80 is unknown, such as immediately after the power of the apparatus body 1A is turned on. In the case where the tray 80 is positioned at the accommodation position, the photo-interrupter 30 alternately outputs the HIGH signal and the LOW signal in a shorter cycle. In the case where the tray 80 is positioned at the detachment position, the output of the photo-interrupter 30 is maintained at the LOW signal. To be noted, even if the motor M2 attempts to move the tray 80 further in the pull-out direction in a state in which the tray 80 is at the detachment position, the tray 80 stays at the detachment position due to restrictions of the movement range of the driving racks 15 and the like.

The controller 17 starts moving the tray 80 in the pull-out direction (first direction) by the motor M2, and then returns the tray 80 to the original position by immediately rotating the motor M2 in the reverse direction in the case where the HIGH signal or the LOW signal of the short cycle is detected. In this case, it is preferable that the motor M2 is rotated in the reverse direction before the tray 80 protrudes to the outside of the frame 16 through the opening 16*a*. In the present embodiment, at least part of the tray 80 positioned at the detachment position protrudes to the outside of the frame 16 through the opening 16*a* (FIG. 6C). In the case where the part of the tray 80 protruding to the outside of the frame 16 at the detachment position is a protruding portion, the motor M2 is preferably rotated in the reverse direction before the protruding portion of the tray 80 starts passing through the opening 16*a*. As a result of this, the controller 17 can identify the position of the tray 80 without the tray 80 protruding to the outside of the frame 16.

To be noted, although an example in which the output time of the LOW signal and the output time of the HIGH signal while the tray 80 moves in the vicinity of the accommodation position are each short has been described in the present embodiment, a configuration in which only one of the output time of the LOW signal and the output time of the HIGH signal is short may be employed. The controller 17 can determine whether or not the tray 80 is in the vicinity of the accommodation position on the basis of the ratio between the output times of the LOW signal and the HIGH signal temporally adjacent to each other. The determination method based on the cycle of the LOW signal and the HIGH signal has a risk that the determination precision thereof decreases in the case where the rotational speed of the motor M2 changes for some reason. In contrast, the determination method based on the ratio between the output times of the LOW signal and the HIGH signal is advantageous in that this determination method is less likely to be affected by the speed change of the motor M2.

In addition, in the encoder disk 33 of the second embodiment, an advantage similar to that of the present embodiment can be also obtained by a configuration in which the width and pitch of several openings 33*a* adjacent to one end of the opening 33*b* are shorter than the width and pitch of the other openings 33*a*.

Fourth Embodiment

In the first to third embodiments, a configuration in which the photo-interrupter 30 alternately outputs the HIGH signal and the LOW signal while the tray 80 is being moved from one toward the other of the accommodation position and the detachment position has been described. In the fourth embodiment, a configuration in which the output of the photo-interrupter 30 while the tray 80 is being moved from one toward the other of the accommodation position to the detachment position is constant will be described.

Figure 15A:
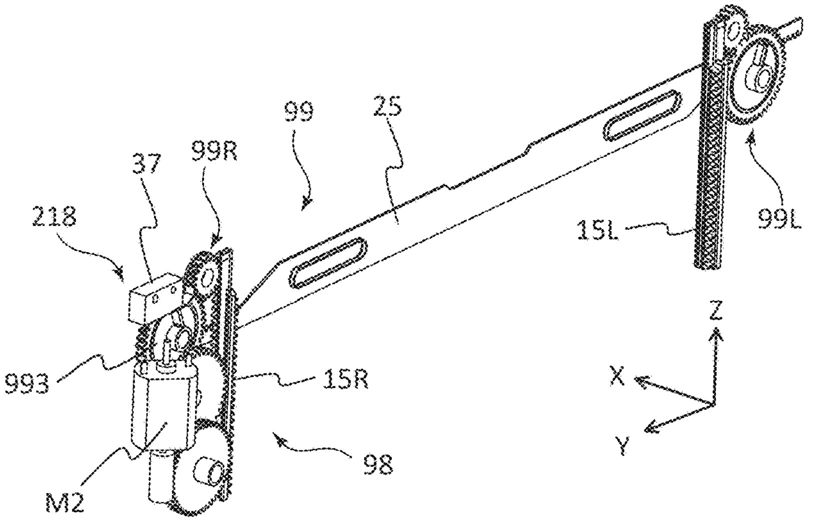
FIGS. 15A to 15D are each an explanatory diagram of a tray position detection mechanism according to a fourth embodiment.
Figure 15B:
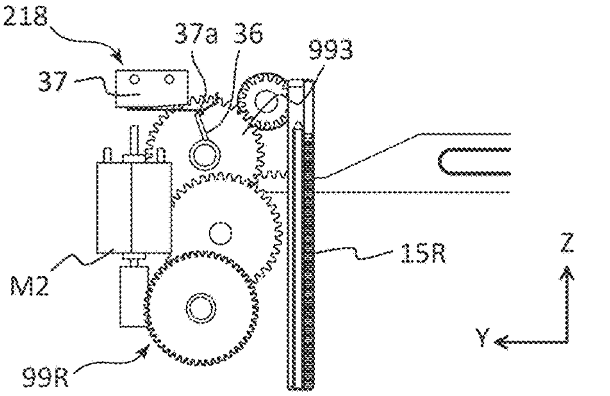
Figure 15C:
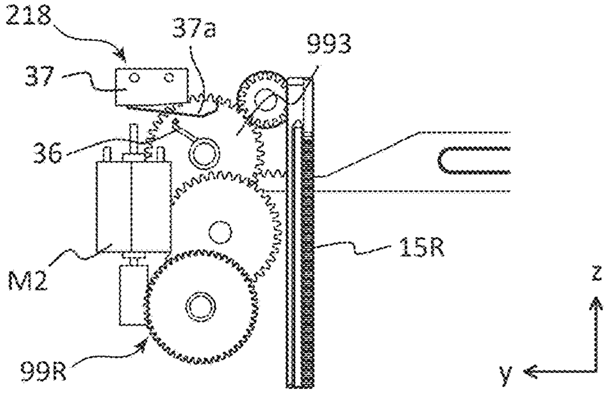
Figure 15D:
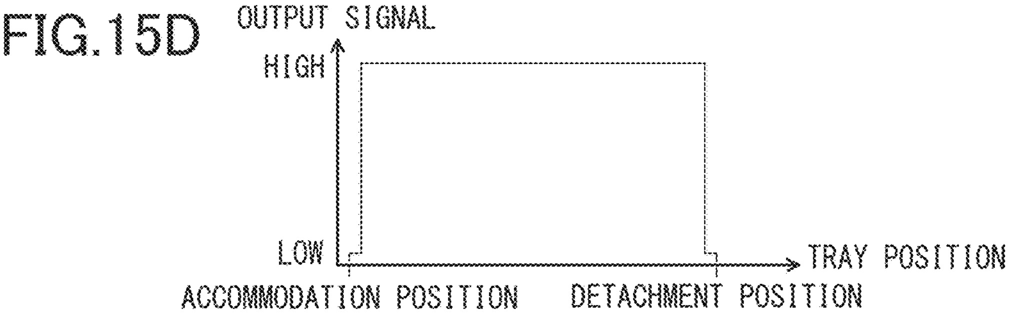

FIG. 15A is a perspective view of the driving device 98 and a tray position detection mechanism 218. FIGS. 15B and 15C are each a side view of the driving device 98 and the tray position detection mechanism 218 as viewed in the X direction. FIG. 15D is a diagram illustrating an example of a signal output from a switch 37 when the tray 80 is moved from the accommodation position toward the detachment position.

As illustrated in FIGS. 15A to 15C, the tray position detection mechanism 218 in the present embodiment includes the third gear 993 of the first gear train 99R and the switch 37. The third gear 993 is a part of the transmission device 99 and is a moving member that moves in an interlocked manner with the movement of the tray 80. The switch 37 functions as a sensor portion that outputs a signal corresponding to the position (rotational angle) of the third gear 993.

The switch 37 includes a contact plate 37*a* serving as an abutted portion. The third gear 993 is provided with a protrusion portion 36 serving as an abutting portion capable of abutting the contact plate 37*a*. The switch 37 is configured to output the LOW signal (OFF signal) in the case where the protrusion portion 36 is abutting the contact plate 37*a* (FIG. 15B), and output the HIGH signal (ON signal) in the case where the protrusion portion 36 is not abutting the contact plate 37*a* (FIG. 15C).

In the case where the tray 80 is at the accommodation position and the case where the tray 80 is at the detachment position, the protrusion portion 36 abuts the contact plate 37*a*. That is, the switch 37 takes a state (first detection state) of outputting the LOW signal serving as a first signal.

The protrusion portion 36 does not abut the contact plate 37*a* while the tray 80 is being moved from one toward the other of the accommodation position and the detachment position. That is, the switch 37 takes a state (second detection state) of outputting the HIGH signal serving as a second signal.

To be noted, the third gear 993 rotates about once in a first rotational direction while the tray 80 moves from the accommodation position to the detachment position. In addition, while the tray 80 moves from the detachment position to the accommodation position, the third gear 993 rotates about once in a second rotational direction opposite to the first rotational direction.

Also in the present embodiment, the controller 17 can detect that the tray 80 is in the accommodation position and that the tray 80 is in the detachment position on the basis of the combination of the information of the movement direction of the tray 80 by the motor M2 and the signal of the switch 37.

That is, the controller 17 determines that the tray 80 has been moved to the detachment position (second position) in the case where the movement direction of the tray 80 by the motor M2 is the pull-out direction (first direction) and the switch 37 is in the first detection state (LOW). In addition, the controller 17 determines that the tray 80 has been moved to the accommodation position (first position) in the case where the movement direction of the tray 80 by the motor M2 is the pull-in direction (second direction) and the switch 37 is in the first detection state (LOW).

Specifically, in the present embodiment, the switch 37 is maintained at the HIGH signal while the tray 80 moves from one toward the other of the accommodation position and the detachment position. Therefore, the controller 17 determines that the tray 80 has been moved to the detachment position in the case where the signal of the switch 37 has changed from the HIGH signal (second signal) to the LOW signal (first signal) after the movement of the tray 80 by the motor M2 in the pull-out direction is started. In addition, the controller 17 determines that the tray 80 has been moved to the accommodation position in the case where the signal of the switch 37 has changed from the HIGH signal (second signal) to the LOW signal (first signal) after the movement of the tray 80 by the motor M2 in the pull-in direction is started.

As a result of this, an image forming apparatus capable of detecting that the support member is in the first position and that the support member is in the second position can be provided in a simple configuration.

In addition, in the case where the position of the tray 80 is unknown, such as immediately after the power of the apparatus body 1A is turned on, the controller 17 can determine that the tray 80 is between the accommodation position and the detachment position in the case where the switch 37 outputs the HIGH signal.

In addition, in the case where the position of the tray 80 is unknown, the controller 17 drives the tray 80 by the motor M2 in the pull-out direction when the switch 37 outputs the LOW signal. The controller 17 can determine that the tray 80 is in the vicinity of the accommodation position (i.e., the tray is closer to the accommodation position than to the detachment position) in the case where the signal of the switch 37 changes from the LOW signal to the HIGH signal, and determine that the tray 80 is at the detachment position in the case where the signal of the switch 37 is maintained at the LOW signal.

Conversely, in the case where the position of the tray 80 is unknown, the controller 17 may drive the tray 80 by the motor M2 in the pull-in direction when the switch 37 outputs the LOW signal. The controller 17 can determine that the tray 80 is in the vicinity of the detachment position (i.e., the tray is closer to the detachment position than to the accommodation position) in the case where the signal of the switch 37 changes from the LOW signal to the HIGH signal, and determine that the tray 80 is at the accommodation position in the case where the signal of the switch 37 is maintained at the LOW signal.

To be noted, although a configuration in which the switch 37 outputs the LOW signal serving as a first signal in the case where the protrusion portion 36 abuts the contact plate 37*a* has been described, a configuration in which the switch 37 outputs the HIGH signal serving as a first signal in the case where the protrusion portion 36 abuts the contact plate 37*a* may be employed. Other Modification Examples The photo-interrupter 30 whose light can be shielded by a moving member and the switch 37 that comes into contact with the moving member have been described as examples of the sensor portion in the first to fourth embodiments described above. The sensor portion is not limited to this, and for example, an optical sensor of a reflective type (photo-reflector) may be used. In this case, a reflective region that reflects the light from the light emitting element toward the light receiving element is provided on the moving member instead of the openings 29, 33*a*, and 33*b* provided in the first and second embodiments. In addition, a magnetic sensor may be used as the sensor portion, and a magnetic encoder may be formed by attaching a magnet to the moving member.

In the first to fourth embodiments described above, a configuration in which the rotary body 90 includes four developing units 50*y* to 50*k* and a color image can be formed by using toners of four colors has been described. However, the rotary body 90 may include three or less developing units, or five or more developing units. In these cases, the number and arrangement of trays and toner cartridges can be appropriately changed in accordance with the number of the developing units. For example, in the first to fourth embodiments described above, a configuration in which four toner cartridges 70*y* to 70*k* are attachable to and detachable from the rotary body 90 has been described as an example. However, a configuration in which the rotary body 90 includes only one developing unit 50*k* and only one toner cartridge 70*k* is attached to the rotary body 90 may be employed. In this case, the rotary body 90 can alternately take a black replacement posture and a black developing posture by rotating about the rotational axis 90C in the clockwise direction of FIG. 1.

In addition, in the first to fourth embodiments described above, a configuration in which the rotary body 90 includes four developing units 50*y* to 50*k* and a color image can be formed by using toners of four colors has been described. However, the rotary body 90 may include a plurality of developing units capable of performing image formation by using toner of the same color. For example, a configuration in which the rotary body 90 includes four black developing units 50*k*, and four toner cartridges 70*k* are attached to the rotary body 90 may be employed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), or the like) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-074991, filed May 2, 2024, which is hereby incorporated by reference herein in its entirety.

What is claimed is:

1. An image forming apparatus comprising:

a rotary configured to rotate and including a developing roller and a storage portion configured to store toner to be supplied to the developing roller;

a toner cartridge that is configured to store the toner and that is attachable to and detachable from the rotary;

a support member attached to the rotary, configured to support the toner cartridge, and movable between a first position and a second position, the first position being a position where supply of the toner from the toner cartridge to the storage portion is allowed, the second position being a position where attachment and detachment of the toner cartridge to and from the rotary are allowed;

a drive source configured to move the support member in a first direction from the first position toward the second position and move the support member in a second direction from the second position toward the first position;

a detection mechanism including a moving member configured to move in an interlocked manner with movement of the support member by the drive source, and a sensor portion configured to output a signal corresponding to a position of the moving member; and a controller configured to receive the signal from the sensor portion and control the drive source, wherein the sensor portion is in a first detection state in a case where the support member is at the first position and in a case where the support member is at the second position, and the sensor portion is in a second detection state different from the first detection state while the support member is being moved from the first position toward the second position or from the second position toward the first position, wherein the controller is configured to determine that the support member is in the second position in a case where movement direction of the support member by the drive source is the first direction and the sensor portion is in the first detection state, and wherein the controller is configured to determine that the support member is in the first position in a case where the movement direction of the support member by the drive source is the second direction and the sensor portion is in the first detection state.

2. The image forming apparatus according to claim 1, further comprising:

a transmission device; and a moving device configured to move the support member by a driving force of the drive source transmitted from the transmission device, wherein the moving member is coupled to the transmission device and configured to move by receiving the driving force.

3. The image forming apparatus according to claim 2, wherein the transmission device is configured to transmit the driving force to the rotary, and wherein the moving device is provided in the rotary.

4. The image forming apparatus according to claim 3, wherein the moving device includes a first driven portion and a second driven portion, wherein the transmission device includes a first driving member provided on a first end side of the rotary in a rotational axis direction of the rotary and configured to transmit the driving force to the first driven portion, a second driving member provided on a second end side of the rotary in the rotational axis direction and configured to transmit the driving force to the second driven portion, and a transmission member configured to reciprocate in a direction along the rotational axis direction and transmit the driving force from the drive source toward the second driving member, and wherein the moving member is coupled to the transmission member.

5. The image forming apparatus according to claim 4, wherein the moving member is configured to reciprocate in a direction along the rotational axis direction.

6. The image forming apparatus according to claim 5, further comprising:

a coupling mechanism configured to couple the transmission member and the moving member to each other, wherein the coupling mechanism is configured such that a movement amount of the moving member is larger than a movement amount of the transmission member.

7. The image forming apparatus according to claim 2, wherein the transmission device includes a gear configured to transmit the driving force, and wherein the moving member is coupled to the gear.

8. The image forming apparatus according to claim 1, further comprising:

a transmission device; and a moving device configured to move the support member by a driving force of the drive source transmitted from the transmission device, wherein the moving member is part of the transmission device.

9. The image forming apparatus according to claim 1, further comprising:

a second toner cartridge; and a second support member attached to the rotary, configured to support the second toner cartridge and to be moved between a third position and a fourth position by the drive source, wherein the moving member is configured to move in an interlocked manner with the second support member in a case where the second support member is moved between the third position and the fourth position, wherein the sensor portion is in the first detection state in a case where the second support member is at the third position and in a case where the second support member is at the fourth position, and the sensor portion is in the second detection state while the second support member is being moved from the third position toward the fourth position or from the fourth position toward the third position, wherein the controller is configured to determine that the second support member is in the fourth position in a case where movement direction of the second support member by the drive source is a direction from the third position toward the fourth position and the sensor portion is in the first detection state, and wherein the controller is configured to determine that the second support member is in the third position in a case where the movement direction of the second support member by the drive source is a direction from the fourth position toward the third position and the sensor portion is in the first detection state.

10. The image forming apparatus according to claim 9, wherein a capacity of the second toner cartridge is larger than a capacity of the toner cartridge, wherein a movement distance of the second toner cartridge from the third position to the fourth position is larger than a movement distance of the toner cartridge from the first position to the second position, and wherein a movement distance of the moving member while the second toner cartridge moves from the third position to the fourth position is equal to a movement distance of the moving member while the toner cartridge moves from the first position to the second position.

11. The image forming apparatus according to claim 1, wherein the first detection state is a state in which the sensor portion continuously outputs a first signal, wherein the second detection state is a state in which the sensor portion alternately outputs the first signal and a second signal different from the first signal.

12. The image forming apparatus according to claim 11, wherein the controller is configured to determine that the support member is at the second position in a case where, after start of movement of the support member in the first direction by the drive source, a signal from the sensor portion has been changed from the second signal to the first signal and the first signal has been continued for a predetermined time or longer, and wherein the controller is configured to determine that the support member is at the first position in a case where, after start of movement of the support member in the second direction by the drive source, the signal from the sensor portion has been changed from the second signal to the first signal and the first signal has been continued for the predetermined time or longer.

13. The image forming apparatus according to claim 11, wherein the controller is configured to identify a position of the support member between the first position and the second position on a basis of a number of times a signal from the sensor portion has been switched between the first signal and the second signal after movement of the support member by the drive source has been started.

14. The image forming apparatus according to claim 11, wherein a cycle of alternate output of the first signal and the second signal in a case where movement of the support member from the first position toward the second position is started is different from a cycle of alternate output of the first signal and the second signal in a case where movement of the support member from the second position toward the first position is started, and wherein the controller is configured to determine a position of the support member on a basis of the cycle of alternate output of the first signal and the second signal in a case where movement of the support member by the drive source is started.

15. The image forming apparatus according to claim 14, further comprising, a body frame configured to accommodate the rotary and provided with an opening, wherein entirety of the support member positioned at the first position is located inside the body frame with respect to the opening, and at least part of the support member positioned at the second position projects outside the body frame through the opening, and wherein the controller is configured to move the support member in the second direction by the drive source in a case where the controller determines that the support member is closer to the first position than to the second position.

16. The image forming apparatus according to claim 11, wherein the sensor portion includes a light emitting element configured to emit light and a light receiving element configured to convert the light into a signal, and is configured to output the first signal in a case where the light is incident on the light receiving element and output the second signal in a case where the light is not incident on the light receiving element, and wherein the moving member includes a plurality of light shielding portions arranged in a movement direction of the moving member, and is configured to allow the light from the light emitting element to reach the light receiving element in a case where the support member is at the first position and a case where the support member is at the second position, and intermittently block the light by the plurality of light shielding portions while the support member is being moved from the first position toward the second position or from the second position toward the first position.

17. The image forming apparatus according to claim 1, wherein the first detection state is a state in which the sensor portion outputs a first signal, and wherein the second detection state is a state in which the sensor portion outputs a second signal different from the first signal.

18. The image forming apparatus according to claim 17, wherein the controller is configured to determine that the support member is at the second position in a case where a signal from the sensor portion has been changed from the second signal to the first signal after movement of the support member in the first direction by the drive source has been started, and wherein the controller is configured to determine that the support member is at the first position in a case where the signal from the sensor portion has been changed from the second signal to the first signal after movement of the support member in the second direction by the drive source has been started.

19. The image forming apparatus according to claim 17, wherein the sensor portion includes an abutted portion, wherein the moving member includes an abutting portion capable of abutting the abutted portion, and is configured such that the abutting portion abuts the abutted portion in a case where the support member is at the first position or the second position and does not abut the abutted portion while the support member is being moved from the first position toward the second position or from the second position toward the first position, and wherein the sensor portion is configured to output the first signal while the abutting portion is abutting the abutted portion and output the second signal while the abutting portion is not abutting the abutted portion.

* * * * *